United States Patent
Yonemaru et al.

(10) Patent No.: US 8,922,603 B2
(45) Date of Patent: Dec. 30, 2014

(54) MULTI-PRIMARY COLOR DISPLAY DEVICE

(75) Inventors: Masashi Yonemaru, Osaka (JP); Masahiko Nakamizo, Osaka (JP); Kenichi Ishii, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 301 days.

(21) Appl. No.: 13/574,892

(22) PCT Filed: Dec. 7, 2010

(86) PCT No.: PCT/JP2010/071910
§ 371 (c)(1),
(2), (4) Date: Jul. 24, 2012

(87) PCT Pub. No.: WO2011/092944
PCT Pub. Date: Aug. 4, 2011

(65) Prior Publication Data
US 2012/0293536 A1    Nov. 22, 2012

(30) Foreign Application Priority Data
Jan. 28, 2010    (JP) .................................. 2010-016621

(51) Int. Cl.
*G09G 5/02*    (2006.01)
*G09G 3/36*    (2006.01)

(52) U.S. Cl.
CPC .......... *G09G 3/3648* (2013.01); *G02F 2201/52* (2013.01); *G09G 3/3614* (2013.01); *G09G 3/3677* (2013.01); *G09G 2300/0452* (2013.01); *G09G 2310/0202* (2013.01)
USPC ............... 345/694; 345/55; 345/98; 345/100; 345/103; 345/589

(58) Field of Classification Search
None
See application file for complete search history.

(56) References Cited

U.S. PATENT DOCUMENTS 6,954,191 B1    10/2005    Hirano et al.
7,907,156 B2 *    3/2011    Todorokihara et al. ....... 345/690
(Continued)

FOREIGN PATENT DOCUMENTS

JP    06-138851 A    5/1994
JP    2001-154636 A    6/2001
(Continued)

OTHER PUBLICATIONS

Official Communication issued in International Patent Application No. PCT/JP2010/071910, mailed on Jan. 11, 2011.

*Primary Examiner* — Antonio A Caschera
(74) *Attorney, Agent, or Firm* — Keating & Bennett, LLP

(57) ABSTRACT

A multi-primary color display device is capable of handling an increased number of primary colors for color image display with a reduced number of external parts, with reduced increase in the amount of drive circuit and reduced increase in operating speed. An active matrix liquid crystal panel includes a display section constituted by pixel formation portions, each made of four sub pixel-formation portions which handle four primary colors. These four sub pixel-formation portions are arranged in a 2×2 matrix pattern. With such a pixel configuration, a source driver drives as many as M source lines, which is two times the number M of pixels arranged in a horizontal direction. A gate driver is formed on the liquid crystal panel integrally with pixel circuit in the display section, and drives as many as N gate lines, which is two times the number N of the pixels arranged in a vertical direction.

3 Claims, 13 Drawing Sheets

(56) References Cited

U.S. PATENT DOCUMENTS

| | | |
|---|---|---|
| 2002/0033809 A1 | 3/2002 | Nakajima |
| 2005/0184998 A1 | 8/2005 | Yang et al. |
| 2007/0109329 A1* | 5/2007 | Roh et al. ............... 345/694 |
| 2010/0315403 A1 | 12/2010 | Kaneyoshi et al. |

FOREIGN PATENT DOCUMENTS

| | | |
|---|---|---|
| JP | 2002-006303 A | 1/2002 |
| JP | 2002-032051 A | 1/2002 |
| JP | 2005-242300 A | 9/2005 |
| WO | 2009/104322 A1 | 8/2009 |

* cited by examiner

MULTI-PRIMARY COLOR DISPLAY DEVICE

TECHNICAL FIELD

The present invention relates to color display devices, and more specifically to multi-primary color display devices which display color images based on four or more primary colors.

BACKGROUND ART

Color image display in a display device is implemented generally by additive color mixing of three primary colors consisting of red (R), green (G) and blue (B). Specifically, in color image display, each pixel is constituted by an R subpixel, a G subpixel and a B subpixel, which handle red, green and blue respectively. Therefore, in a liquid crystal color-display panel for example, each pixel formation portion for forming a pixel is constituted by an R sub pixel-formation portion, a G sub pixel-formation portion and a B sub pixel-formation portion for controlling the amount of light transmission in red, green and blue respectively. In this case, the three sub pixel-formation portions (R sub pixel-formation portion, G sub pixel-formation portion and B sub pixel-formation portion) which handle the three primary colors of RGB are typically all vertically long rectangular, and are positioned side by side in the direction in which the gate lines extend, forming a pixel formation portion.

Meanwhile, in recent years, liquid crystal display devices in television receivers, for example, begin to use multi-primary color technology for improved display performance, in which traditional three primary colors of RGB for the color image display are replaced by four or more primary colors.

For example, in a four primary color liquid crystal display device in which color image display is based on four primary colors, it is a common practice to use a configuration as shown in FIG. 18, where four sub pixel-formation portions Ps(i, j) which handle the four primary colors are formed side by side in the direction in which the gate lines Lg extend (hereinafter, this direction will also be referred to as "horizontal direction" regardless of the actual direction since this direction is generally the horizontal direction in actual applications) (also, the above-described configuration will be called "vertically long subpixel configuration" hereinafter).

On the other hand, there is also proposed a configuration as shown in FIG. 19, where four sub pixel-formation portions Ps(i, j) which handle the four primary colors are formed side by side in the direction in which the source lines Ls extend (hereinafter, this direction will also be referred to as "vertical direction" regardless of the actual direction since this direction is generally the vertical direction in actual applications) (also, the above-described configuration will be called "horizontally long subpixel configuration" hereinafter).

The following Patent Literatures 1 and 2 disclose techniques relevant to the present invention. Specifically, Patent Literature 1 discloses a matrix display device including a display section formed by: a plurality of scanning lines and a plurality of data lines disposed in a matrix pattern; unit pixels which have a predetermined color order in the vertical direction of the display screen and are arranged in a matrix pattern; and constituent elements R, G and B which handles the colors in the pixel and are disposed at one of the intersections made by the scanning lines and the data lines. This matrix display device is classified as a horizontally long subpixel configuration category described above. In this matrix display device, data signal supply to the data lines is performed a plurality of times (three times according to an embodiment) for the respective colors during the period of 1H, and selection pulse supply to the scanning lines is performed a plurality of times (three times according to the embodiment) for the respective colors during the period of 1H. Patent Literature 2 discloses a liquid-crystal color display device in which each pixel is constituted by four kinds of color filter elements each corresponding to a pixel electrode, and these four kinds of color filters which constitute one pixel are disposed at up and down, left and right positions (i.e., disposed in a matrix of 2×2).

DOCUMENTS ON CONVENTIONAL ART

Patent Literature

Patent Literature 1: JP-A 2002-32051 Gazette
Patent Literature 2: JP-A 2002-6303 Gazette

SUMMARY OF THE INVENTION

Problems to be Solved by the Invention

If a four primary color liquid crystal display device is implemented by a vertically long subpixel configuration (FIG. 18), there is a disadvantage compared to ordinary pixel configuration in color image display based on three primary colors, i.e., a pixel configuration in which three vertically long sub pixel-formation portions which handle the three primary colors are located side by side in the horizontal direction (hereinafter called "the first conventional pixel configuration"). Specifically, the number of source lines serving as data signal lines is increased to 4/3 times and accordingly, the amount of source driver circuit must be increased. The amount of source driver circuit is much greater than the amount of the gate driver. Also, operating speed of the source driver is much faster than that of the gate driver. For these reasons, increase in the number of source lines when implementing multi-primary color display should be minimized desirably.

If, on the other hand, a horizontally long subpixel configuration (FIG. 19) is utilized in a four primary color liquid crystal display device, the number of source lines can be reduced to a quarter of the number in a vertically long subpixel configuration. On the contrary, however, the number of gate lines serving as scanning signal lines must be quadrupled, the scanning rate (the number of gate line to be scanned within a unit time) must also be quadrupled, and accordingly, the number of gate driver IC chips used as external parts must be increased and their operation speed must also be increased.

It is therefore an object of the present invention to provide a multi-primary color display device which is capable of using an increased number of primary colors for color image display with a reduced number of external parts, with reduced increase in the amount of drive circuit and reduced increase in operating speed.

Means for Solving the Problems

A first aspect of the present invention provides a multi-primary color display device for displaying color images based on four or a greater predetermined number of primary colors. The display device includes:
a display panel which has a plurality of pixel formation portions arranged in a matrix pattern, a plurality of data signal lines and a plurality of scanning signal lines crossing the data signal lines;

a data signal line drive circuit for applying a plurality of data signals which represent an image to be displayed, to the data signal lines; and a scanning signal line drive circuit for selectively activating the scanning signal lines.

The above display device includes the following arrangements: The scanning signal line drive circuit is formed on the display panel.

Each pixel formation portion includes a predetermined number of sub pixel-formation portions for forming subpixels of the predetermined number of primary colors.

The predetermined number of sub pixel-formation portions included in each pixel formation portion are arranged in a matrix pattern consisting of a plurality of rows extending in a direction in which the scanning signal lines extend and a plurality of columns extending in a direction in which the data signal lines extend.

Each of the sub pixel-formation portions included in the pixel formation portions corresponds to one of intersections made by the data signal lines and the scanning signal lines, and is connected to the data signal line and the scanning signal line which pass through said intersection.

A second aspect of the present invention provides the multi-primary color display device according to the first aspect of the present invention with the following arrangements:

The display device further includes a connection switching circuit formed on the display panel, between the data signal line drive circuit and the data signal lines.

The data signal line drive circuit has a plurality of output terminals each corresponding to one of data signal line groups made by grouping the data signal lines into groups of two or more data signal lines; and outputs from each output terminal, data signals to be carried by the data signal line group corresponding to that output terminal, in a time-division manner.

The connection switching circuit connects each output terminal of the data signal line drive circuit to one of the data signal lines in the corresponding data signal line group while switching the data signal line connected to each output terminal within the corresponding data signal line group in accordance with the time-division manner.

A third aspect of the present invention provides the multi-primary color display device according to the first aspect of the present invention with the following arrangements:

Each sub pixel-formation portion includes a predetermined capacitance, captures and supplies a voltage in the data signal line which passes through the corresponding intersection to the predetermined capacitance when the corresponding scanning signal line is activated.

The scanning signal line drive circuit sequentially activates the scanning signal lines for a predetermined period so that each sub pixel-formation portion captures the voltage in the data signal line as a subpixel value of the image to be displayed, while also activating each scanning signal line for a predetermined period preceding said period of sequential activation by as many periods as a vertical color cyclic number, which is defined as a quantity of sub pixel-formation portions within each pixel formation portion in a direction in which the data signal lines extend.

A fourth aspect of the present invention provides the multi-primary color display device according to the third aspect of the present invention with the following arrangements:

The vertical color cyclic number is provided by an even number.

The data signal line drive circuit reverses polarity of the data signals once per a number of horizontal periods given by a multiplication of the horizontal period by a quotient which is obtained by dividing the vertical color cyclic number by an even aliquot thereof.

A fifth aspect of the present invention provides the multi-primary color display device according to the fourth aspect of the present invention with the following arrangements:

The color images are based on four primary colors.

The four sub pixel-formation portion included in each pixel formation portion are arranged in a matrix pattern consisting of two rows extending in a direction in which the scanning signal lines extend and two columns extending in a direction in which the data signal lines extend.

The data signal line drive circuit reverses polarity of the data signals once per each horizontal period.

A sixth aspect of the present invention provides the multi-primary color display device according to the first aspect of the present invention with the following arrangements:

Each sub pixel-formation portion includes a predetermined capacitance, captures and supplies a voltage in the data signal line which passes through the corresponding intersection to the predetermined capacitance when the corresponding scanning signal line is activated.

The scanning signal line drive circuit sequentially activates the scanning signal lines for a predetermined period so that each sub pixel-formation portion captures the voltage in the data signal line as a subpixel value of the image to be displayed, while also activating each scanning signal line for a predetermined period immediately preceding said period of sequential activation.

A seventh aspect of the present invention provides the multi-primary color display device according to the sixth aspect of the present invention with the following arrangement:

The data signal line drive circuit generates the data signals of such a fashion that polarity of the data signals is reversed once per one or a greater, predetermined number of frame periods but not reversed within the same frame period.

Other aspects of the present invention are not presented here since they will be clear from the first through the seventh aspects of the present invention and descriptions to be provided later regarding embodiments.

Advantages of the Invention

According to the first aspect of the present invention, each pixel formation portion is constituted by a predetermined number of sub pixel-formation portions for handling four or a greater predetermined number of primary colors, and these sub pixel-formation portions are arranged in a matrix pattern consisting of a plurality of rows extending in a direction in which the scanning signal lines extend (horizontal direction) and a plurality of columns extending in a direction in which the data signal lines extend (vertical direction). Therefore, it is possible to reduce the number of data signal lines or the scanning signal lines as compared to pixel configurations (FIG. 18 or FIG. 19) in which as many sub pixel-formation portions as the primary colors are arranged in a straight line pattern in the direction in which the scanning signal lines extend or in the direction in which the data signal lines extend. Also, in the first aspect of the present invention, the scanning signal line drive circuit is formed on the display panel in order to reduce the number of external parts. With these arrangements, it is possible to increase the number of primary colors for color image display thereby improving display capability such as color reproduction capability in multi-primary color display devices while reducing the number of external parts, reducing increase in the frame area of the display panel, as well as reducing increase in the amount and operating speed of drive circuits.

According to the second aspect of the present invention, data signals which are to be carried by a data signal line group corresponding to each output terminal of the data signal line drive circuit are outputted from that output terminal in a time-division manner, and the data signal line connected to that output terminal is switched within the data signal line group corresponding to that output terminal in accordance with the said time-division manner. This makes it possible to widen the connection pitch of the output terminals in the data signal line drive circuit to the data signal lines, and to reduce the amount of circuit, operation speed and power consumption of the data signal line drive circuit. Thus, combined with the arrangement that as many sub pixel-formation portions as the number of primary colors are arranged in a matrix pattern, the present arrangement makes it possible to reduce problems associated with increased number of primary colors, including decrease in connection pitch, increase in the amount of circuit, increase in operating speed and power consumption in multi-primary color display devices.

According to the third aspect of the present invention, not only the scanning signal lines of the display panel are sequentially activated for a predetermined period so that each sub pixel-formation portion will capture a voltage in the data signal line which passes through the corresponding intersection, as a subpixel value of an image which is to be displayed, but also the scanning signal lines are activated for a predetermined period which precedes the said activation period by as many periods as the vertical color cyclic number. As a result, preliminary charging is performed to the predetermined capacitance before a voltage which represents the subpixel value of the image to be displayed is captured by the sub pixel-formation portion and supplied to the said predetermined capacitance, by a voltage which represents the subpixel value of the same color as the said subpixel value. The arrangement improves charging rate of the predetermined capacitance which is supposed to hold a voltage that represent the subpixel value for the image to be displayed, and therefore prevents deficient charging which could otherwise be a problem in multi-primary color display devices.

According to the fourth aspect of the present invention, preliminary charging is performed to the predetermined capacitance before a voltage which represents the subpixel value of the image to be displayed is captured by the sub pixel-formation portion and supplied to the said predetermined capacitance, by a voltage which represents the subpixel value of the same color as the said subpixel value in liquid crystal display devices which utilize alternate-current driving method where data signal polarity is reversed periodically so that voltage application to the liquid crystal is performed in an AC fashion. Therefore, even if AC driving method is used, the arrangement improves charging rate of each predetermined capacitance which is supposed to hold a voltage that represent the subpixel value for the image to be displayed, and therefore prevents deficient charging which could otherwise be a problem in multi-primary color display devices.

The fifth aspect of the present invention provides the same advantages as offered by the fourth aspect of the present invention, in AC-driven display devices such as four primary color liquid crystal display devices which display color images based on four primary colors.

According to the sixth aspect of the present invention, not only the scanning signal lines of the display panel are sequentially activated for a predetermined period so that each sub pixel-formation portion will capture a voltage in the data signal line which passes through the corresponding intersection, as a subpixel value of an image which is to be displayed, but also the scanning signal lines are activated for a predetermined period immediately preceding the said activation period. In this arrangement, preliminary charging is performed to the predetermined capacitance before a voltage which represents the subpixel value of the image to be displayed is captured by the sub pixel-formation portion and supplied to the predetermined capacitance. Therefore, the arrangement improves charging rate of the predetermined capacitance which is supposed to hold a voltage that represent the subpixel value for the image to be displayed, and therefore prevents deficient charging which could otherwise be a problem in multi-primary color display devices.

According to the seventh aspect of the present invention, preliminary charging is performed to the predetermined capacitance during a predetermined period immediately preceding a period when a voltage which represents the subpixel value of the image to be displayed is captured by the sub pixel-formation portion and supplied to predetermined capacitance, by a voltage which has the same polarity as the said voltage, in liquid crystal display devices which utilize alternate-current driving method where data signal polarity is reversed periodically so that voltage application to the liquid crystal is performed in an AC fashion. Therefore, even if AC driving method is used, the arrangement improves charging rate of each predetermined capacitance which is supposed to hold a voltage that represent the subpixel value for the image to be displayed, and therefore prevents deficient charging which could otherwise be a problem in multi-primary color display devices.

MODE FOR CARRYING OUT THE INVENTION

Hereinafter, embodiments of the present invention will be described with reference to the attached drawings.

<1. First Embodiment>
<1.1 Overall Configuration>

Figure 1:
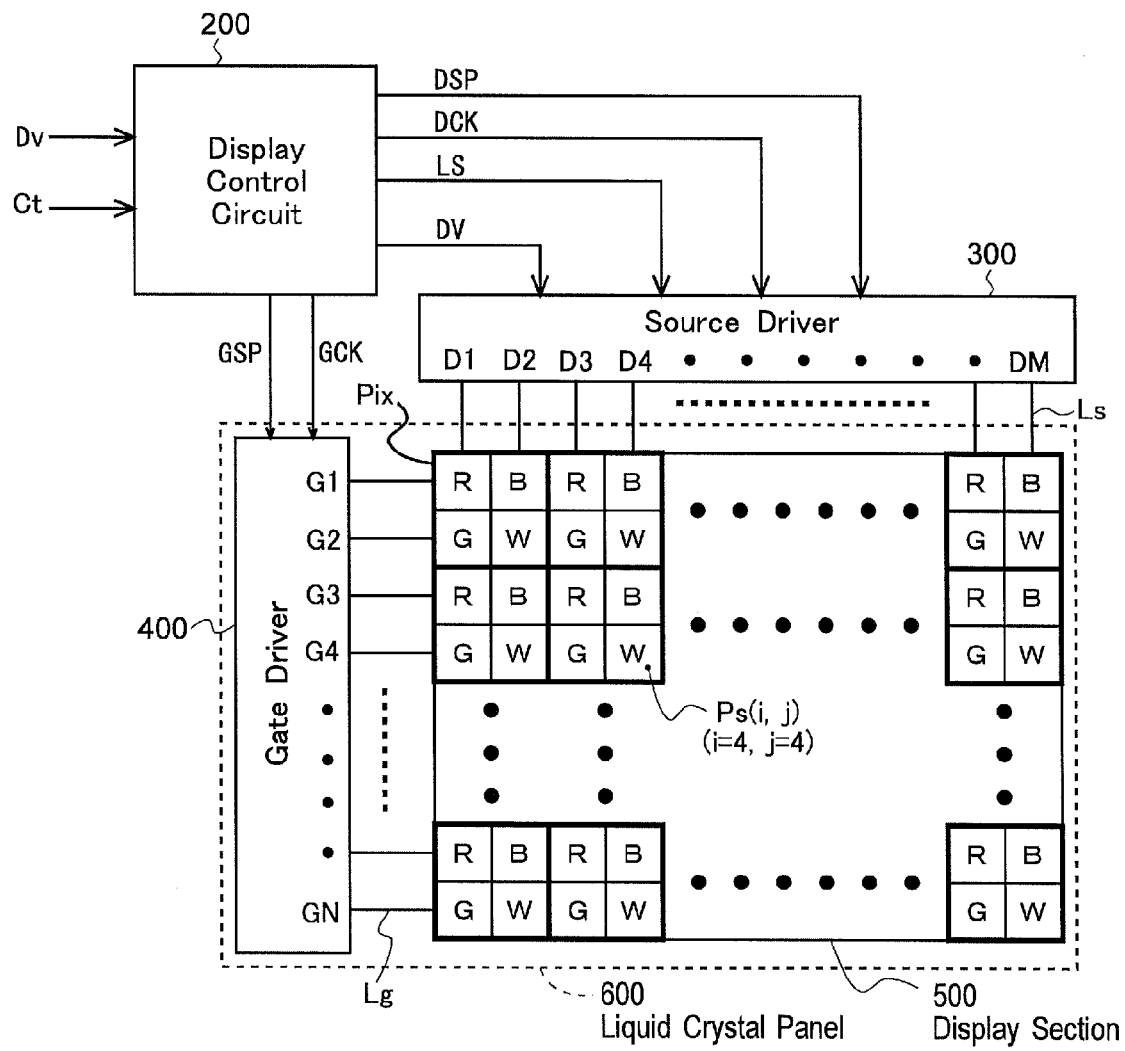
FIG. 1 is a block diagram which shows a configuration of a four primary color liquid crystal display device that is a multi-primary color display device according to a first embodiment of the present invention.

FIG. 1 is a block diagram which shows an overall configuration of a multi-primary color display device according to a first embodiment of the present invention. This display device is a four primary color liquid crystal display device which displays color images based on four primary colors consisting of R (red), G (green), B (blue) and W (white), and includes a liquid crystal panel 600 as a display panel, a source driver 300 as a data signal line drive circuit, and a display control circuit 200. The liquid crystal panel 600 includes an insulating, first substrate called TFT substrate; an insulating second substrate called CF substrate; and a liquid crystal layer sandwiched between these first and the second substrates. The TFT substrate and the CF substrate are typically provided by glass substrates. The TFT substrate is formed with a plurality (M) of source lines Ls serving as data signal lines; a plurality (N) of gate lines Lg serving as scanning signal lines crossing the plurality (M) of source lines Ls; and a plurality (N×M) of pixel circuits each formed correspondingly to one of the intersections made by the plurality of source lines Ls and the plurality (N) of gate lines Lg. The TFT substrate is also formed with a gate driver 400 which serves as a scanning signal line drive circuit. The gate driver 400 and the pixel circuits are formed integrally with each other (simultaneously in the same process) on the TFT substrate, using thin film transistors (TFTs). A liquid crystal panel which includes such a gate driver 400 and pixel circuits will hereinafter be called "gate driver monolithic panel" or "GDM panel."

The CF substrate, on the other hand, is formed with a common electrode Ec. In addition, color filters for the four primary colors R, G, B and W, as well as various optical compensation films (e.g. polarization plate) are applied to this substrate. It should be noted here that the portions corresponding to the W subpixels are provided with an achromic or substantially achromic color filter. However, configurations in which no color filters are provided in these portions are also acceptable. Also, the portions corresponding to the W subpixels may be provided with a chromatic color filter which has a color of Y (yellow) for example. Further, although the above-described R, G, B and W sub pixel-formation portions are designed to handle four colors consisting of blue, green, red and white, this is not limiting. In other words, the present invention is applicable to variety of combinations of various multiple colors.

As shown in FIG. 1, in the present embodiment, a plurality of pixel formation portions Pix which are arranged in a matrix pattern in the liquid crystal panel 600 constitute a display section 500. Each pixel formation portion Pix is constituted by an R sub pixel-formation portion, a G sub pixel-formation portion, a B sub pixel-formation portion and a W sub pixel-formation portion which handle the four primary colors of R, G, B and W respectively (Note that any sub pixel-formation portions will be indicated by a reference symbol "Ps"). These four sub pixel-formation portions Ps are arranged in a 2×2 matrix pattern (consisting of two rows in the horizontal direction and two columns in the vertical direction). Therefore, if the number of pixel formation portions Pix included in the horizontal direction (the direction in which the gate lines Lg extend) of the display section 500 is represented by Mpix and the number of pixel formation portions Pix included in the vertical direction (the direction in which the source lines Ls extend) is represented by Npix, then the display section 500 has an N×M matrix configuration in which there are M=2×Mpix sub pixel-formation portions in the horizontal direction and there are N=2×Npix sub pixel-formation portions in the vertical direction. It should be noted here that the R sub pixel-formation portion, the G sub pixel-formation portion, the B sub pixel-formation portion and the W sub pixel-formation portion include R, G, B and W color filters respectively which constitute the four primary colors, in order to form R, G, B and W subpixels in the images to be displayed.

Figure 2:
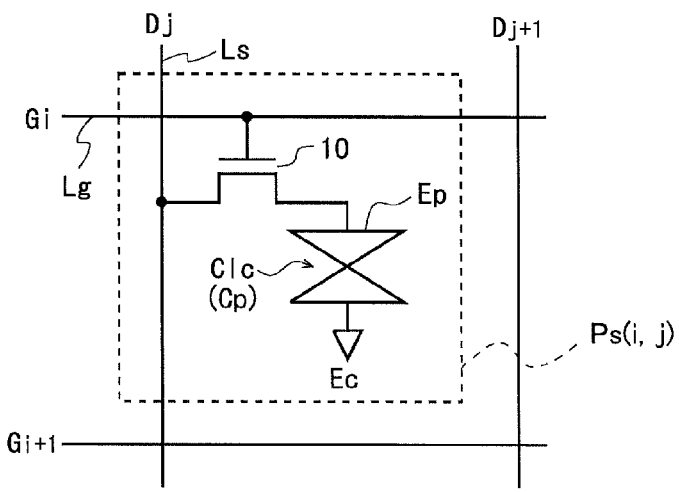
FIG. 2 is a circuit diagram which shows an electrical configuration of a sub pixel-formation portion in the first embodiment.

In the display section 500 as described above, each sub pixel-formation portion Ps is constituted by the above-mentioned pixel circuit formed on the TFT substrate, the above-mentioned liquid crystal layer, the above-mentioned common electrode Ec, the above-mentioned R, G, B, W color filters, etc. Note, however, that the liquid crystal layer and the common electrode Ec are provided commonly to the above-mentioned plurality (N×M) of sub pixel-formation portions Ps. Note, also, that the display section 500 includes the M source lines Ls and the N gate lines Lg formed on the TFT substrate. FIG. 2 is a circuit diagram showing an electrical configuration of a sub pixel-formation portion which includes a pixel circuit formed to correspond to an intersection made by the i-th gate line Lg and the j-th source line Ls (hereinafter, this sub pixel-formation portion will be indicated by a reference symbol "Ps(i, j)". This sub pixel-formation portion Ps(i, j) can be any of the R sub pixel-formation portion, the G sub pixel-formation portion, the B sub pixel-formation portion and the W sub pixel-formation portion, corresponding to the intersection which is made by the i-th gate line Lg, i.e., one of the lines for carrying a scanning signal Gi, and the j-th source line Ls, i.e., one of the lines for carrying a data signal Dj. The sub pixel-formation portion Ps(i, j) includes a TFT 10 which serves as a switching element and has its source electrode connected to the source line Ls that passes through the above-described intersection and has its gate electrode connected to the gate line Lg which passes through the said intersection; a pixel electrode Ep which is connected to the drain electrode of the TFT 10; and a liquid crystal capacitance Clc (hereinafter will also be called "pixel capacitance Cp") which is formed by the pixel electrode Ep, the common electrode Ec and the liquid crystal layer sandwiched thereby.

The display control circuit 200 receives an image signal Dv which represents an image to be displayed and a timing control signal Ct from outside, and then outputs an image signal DV which is a digital image signal to be displayed, serially for each pixel unit, while outputting various other signals including a data start pulse signal DSP, a data clock signal DCK, a latch strobe signal LS, a gate start pulse signal GSP and a gate clock signal GCK, for controlling image display timing in the display section 500 of the liquid crystal panel 600.

Of these signals which are generated by the display control circuit 200, the digital image signal DV, the data start pulse signal DSP, the data clock signal DCK, and the latch strobe signal LS are supplied to the source driver 300 whereas the gate start pulse signal GSP and the gate clock signal GCK are supplied to the gate driver 400. Also, based on the above-mentioned clock signals, etc., the display control circuit 200 generates a polarity reversion control signal (not illustrated) for AC driving of the display section 500, and supplies the signal to the source driver 300.

Based on the digital image signal DV, the data clock signal DCK, the data start pulse signal DSP, the latch strobe signal LS, etc., the source driver 300 generates analog voltages as data signals D1, D2, . . . , DM for driving the display section 500, and applies these signals to M (=2×Mpix) source lines Ls in the liquid crystal panel 600 respectively.

Based on the gate clock signals GCK and the gate start pulse signal GSP, the gate driver 400 generates scanning signals G1, G2, G3, . . . , GN, and applies these scanning signals G1, G2, G3, . . . , GN to N (2×Npix) gate lines Lg in the liquid crystal panel 600 respectively, thereby selectively activating each of the N gate lines Lg sequentially for one horizontal period.

With the above-described operations, the data signals D1 through DM based on the digital image signal DV are applied to the source lines Ls whereas the scanning signals G1 through GM are applied to the gate lines Lg in the liquid crystal panel 600. Meanwhile, the common electrode Ec is supplied with a common voltage signal Vcom from the unillustrated common electrode drive circuit. Consequently, each sub pixel-formation portion Ps(i, j) in the display section 500 receives, via its TFT 10, the data signal Dj (a voltage in the source line Ls) from the j-th source line Ls which passes through the corresponding intersection, and gives it to the pixel capacitance Cp (liquid crystal capacitance Clc) when the i-th gate line Lg which passes through the corresponding intersection is activated. When the i-th gate line Lg is deactivated thereafter, the voltage which represents the data signal Dj is then held in the pixel capacitance Cp until the i-th gate line Lg is activated again. As the voltage, which represents the data signal Dj, is supplied to and held by each pixel capacitance Cp, i.e., each liquid crystal capacitance Clc, the liquid crystal layer in the display section 500 receives voltages in accordance with the digital image signal DV, and changes its light transmissivity accordingly, thereby displaying a color image represented by the external input of the image signal Dv. Each pixel formation portion Pix in the display section 500 is constituted by a 2×2 matrix of an R sub pixel-formation portion, a G sub pixel-formation portion, a B sub pixel-formation portion, and a W sub pixel-formation portion. Therefore, the color image represented by the image signal Dv is displayed based on the four primary colors of RGBW.

<1.2 Operation>

Figure 3:
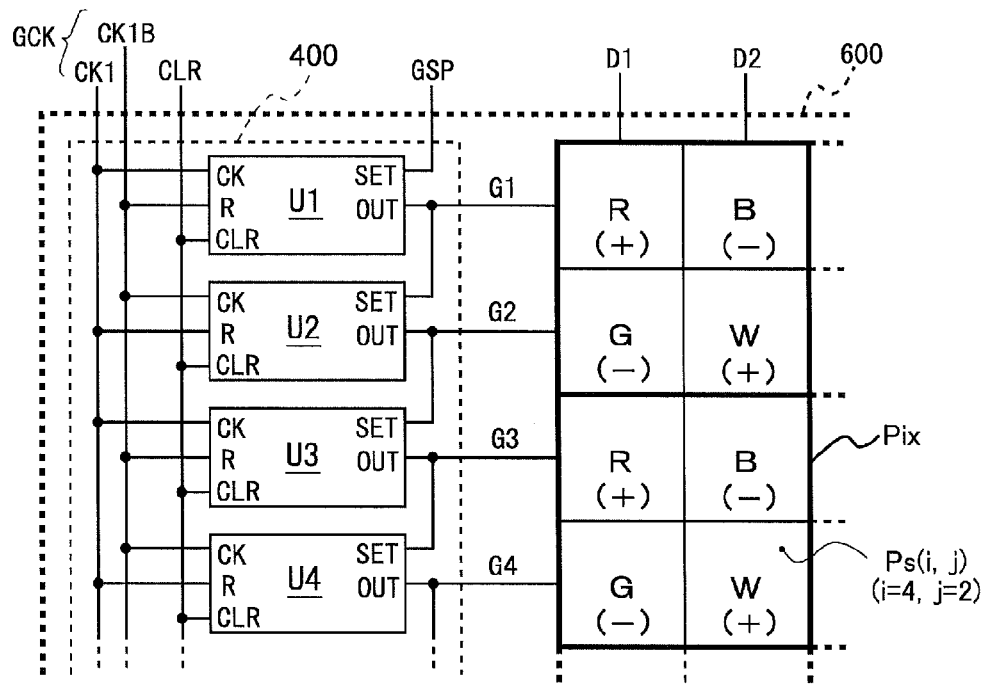
FIG. 3 is a circuit diagram which shows a configuration of a gate driver in the first embodiment.
Figure 4:
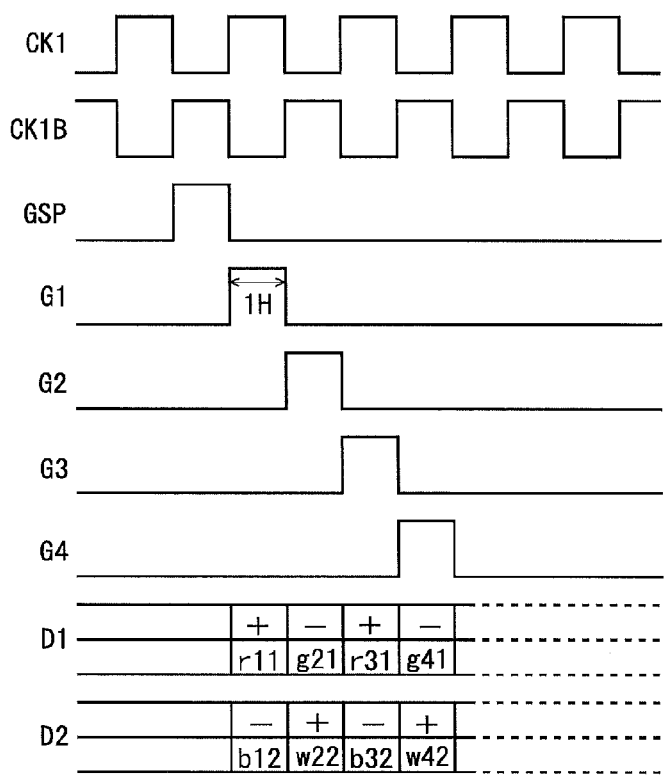
FIG. 4 is a timing chart for describing an operation of a multi-primary color display device according to the first embodiment.

FIG. 3 is a circuit diagram which shows a configuration of the gate driver 400 in the present embodiment whereas FIG. 4 is a timing chart for describing an operation of the four primary color liquid crystal display device according to the present embodiment. Hereinafter, an operation of this four primary color liquid crystal display device according to the present embodiment will be described with reference to FIG. 3 and FIG. 4.

As shown in FIG. 3, the gate driver 400 is constituted by utilizing as many as N, cascade-connected unit circuits (hereinafter will be called "GD unit circuit") U1 through UN. Each GD unit circuit Ui includes a bistable circuit, and has a set terminal SET, a reset terminal R, a clock terminal CK, a clearing terminal CLR, and an output terminal OUT. The GD unit circuit U1 in the first stage has its SET terminal supplied with the gate start pulse GSP from the display control circuit 200. All the other GD unit circuits Ui in the other stages except for the one in the last stage, have their output terminals OUT connected to the set terminal SET of the GD unit circuit Ui+1 (i=1, 2, . . . , N−1) in the next stage. The GD unit circuit UN in the last stage has its output terminal OUT connected to none. As shown in FIG. 4, the gate clock signal GCK from the display control circuit 200 consists of a first clock signal CK1 and its logical inversion signal called reversed clock signal CK1B. The first clock signal CK1 is inputted to the clock terminals CK of odd-numbered GD unit circuits U2k−1 and to the reset terminals R of the even-numbered GD unit circuits U2k whereas the first reversed clock signal CK1B is inputted to the clock terminals CK of the even-numbered GD unit circuits U2k and to the reset terminals R of the odd-numbered GD unit circuits U2k−1 (k=1, 2, . . . ). The display control circuit 200 also generates a clearing signal CLR (unillustrated) which is a signal for resetting all of the GD unit circuits U1 through UN in the gate driver 400 thereby deactivating all of the scanning signals G1 through GN (deactivating all of the gate lines Lg). The clearing signal is inputted to the clearing terminal CLR of each GD unit circuit Ui.

With the above-described wiring connections and signal applications, the N unit circuits U1 through UN in the gate driver 400 operate as an N-stage shift register. Thus, based on the gate start pulse GSP and gate clock signal GCK (the first clock signal CK1 and the first reversed clock signal CK1B), the gate driver 400 outputs scanning signals G1 through GN, which assume a high level (H level) sequentially as shown in FIG. 4, and inputs these signals to the N gate lines Lg. The gate line Lg supplied with the H-level scanning signal Gi is activated, turning ON the TFTs 10 of sub pixel-formation portions Ps(i, j) (j=1 through M) which are connected to the gate lines Lg. On the other hand, those gate lines Lg supplied with the low level (L-level) scanning signal Gi are deactivated, turning OFF the TFTs 10 of sub pixel-formation portions Ps(i, j) (j=1 through M) which are connected to these gate line Lg.

As shown in FIG. 4, the source driver 300 outputs to each source line Ls a data signal Dj which is a voltage to be captured and held by the sub pixel-formation portion Ps(i, j) (i=1 through N) connected to the relevant source line; and reverses the polarity of the data signal Dj for each horizontal period (1H period). In FIG. 4, each of the timing charts of the data signals D1, D2 has a two-tier structure of an upper and a lower rows. The upper row shows the polarity of the data signals D1, D2, whereas the lower row shows values of the data signals D1, D2. The symbol xij (x=r, g, b, w; i=1, 2, ..., N; j=1, 2, ..., M) represents a value which indicates a voltage to be captured and held by the X sub pixel-formation portion Ps(i, j) (this notation system in the timing chart of the data signals D1, D2 will also be used for the other timing charts which will be referenced hereinafter). It should be noted here that the term one horizontal period used herein is a period which is equal to the pulse width of the scanning signal Gj, i.e., a period which is given by a division of one frame period by the number N of the gate lines Lg.

For example, in the timing chart shown in FIG. 4, the data signal D1 takes a positive-polarity signal value r11 for a period in which the scanning signal G1 is active (H level), i.e., during a period in which the first gate line Lg is activated; and a positive voltage which corresponds to this signal value r11 is captured by the R sub pixel-formation portion Ps(1, 1) (see FIG. 3). In the period when the scanning signal G2 is active, the data signal D1 takes a negative-polarity signal value g21; and a negative voltage which corresponds to this signal value g21 is captured by the G sub pixel-formation portion Ps(2, 1) (see FIG. 3).

As will be understood from the data signals D1, D2 in FIG. 4, the present embodiment makes use of a so-called dot inversion drive method, in which polarity of the voltage captured by each sub pixel-formation portion Ps(i, j) and held by the pixel capacitance Cp is inverted per each source line and per each gate line.

<1.3 Pixel Configuration and Gate Driver Unit Circuit>

Figure 5:
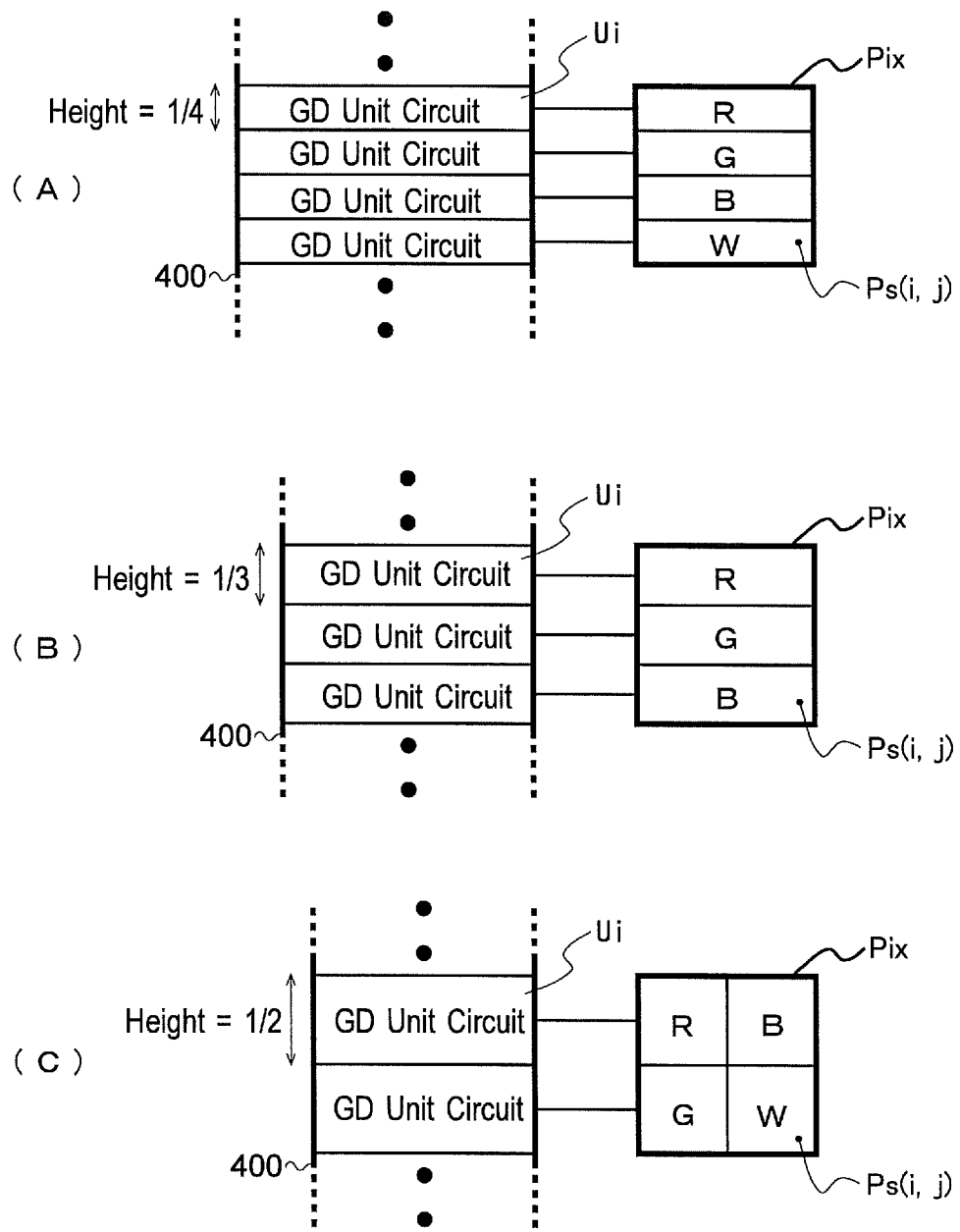
FIG. 5 includes three diagrams: Block diagram (A) is for describing a relationship between pixel configuration and gate driver unit circuit (GD unit circuit) in a four primary color display device of a horizontally long subpixel configuration; block diagram (B) is for describing a relationship between pixel configuration and GD unit circuit in a three primary color display device of a horizontally long subpixel configuration; and block diagram (C) is for describing a relationship between pixel configuration and GD unit circuit in the present embodiment.
Figure 18:
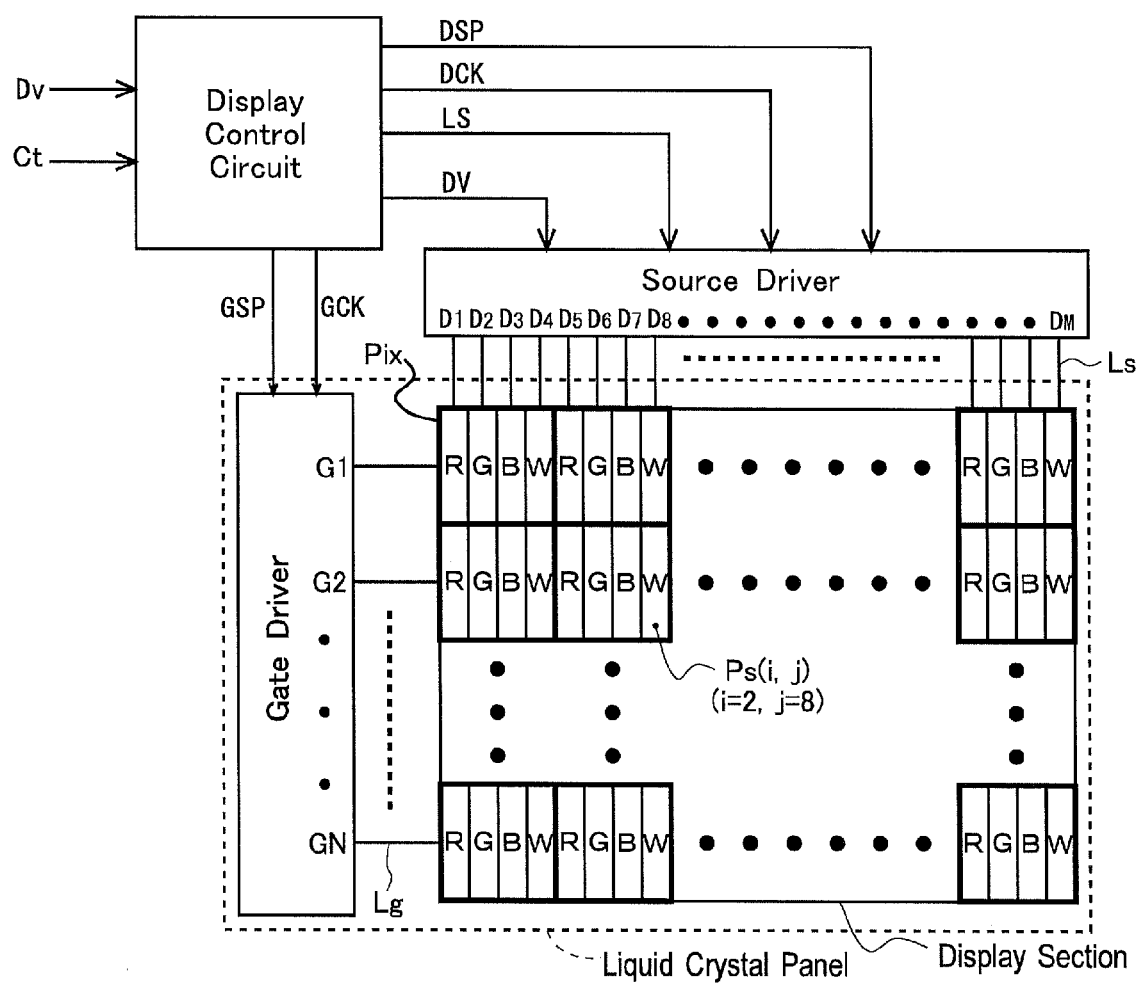
FIG. 18 is a block diagram which shows a configuration of a four primary color liquid crystal display device that is a conventional multi-primary color display device utilizing a vertically long subpixel configuration.

FIG. 5(A) is a block diagram for describing a relationship between pixel configuration and gate driver unit circuit (GD unit circuit) in a four primary color display device of a horizontally long subpixel configuration; FIG. 5(B) is a block diagram for describing a relationship between pixel configuration and GD unit circuit in a three primary color display device of a horizontally long subpixel configuration (such as the earlier-described display device which is disclosed in Patent Literature 1); and FIG. 5(C) is a block diagram for describing a relationship between pixel configuration and GD unit circuit in the present embodiment. When compared to a conventional display device of a vertically long subpixel configuration as shown in FIG. 18, the height (the dimension in which the source lines Ls extend) of the GD unit circuit Ui is ¼ in the four primary colors display device of a horizontally long subpixel configuration as shown in FIG. 5(A), ⅓ in a three primary colors display device of a horizontally long subpixel configuration as shown in FIG. 5(B), and ½ in the present embodiment of a pixel configuration as shown in FIG. 5 (C) where four sub pixel-formation portions which handles four primary colors are arranged in a 2×2 matrix pattern (assuming that all of the above examples are the same in their size of the display section 500 and the number of pixels).

As understood from the comparison between FIG. 5(A) and FIG. 5(B), if the number of primary colors is increased from three to four in a display device of a horizontally long subpixel configuration, the following problems will result:

(1) Increase in Scanning Rate

Scanning rate (the number of gate lines scanned in a unit time) is increased to 4/3 times. This requires increased operation speed of the gate driver, resulting in increased size of the TFTs which are utilized to constitute the gate driver. This results in increased power consumption and increased area in the liquid crystal panel 600 (in the TFT substrate thereof) occupied by the gate driver.

(2) Decrease in the height of GD unit circuit

The height (dimension in the direction in which the source lines Ls extend, i.e., vertical size) of the GD unit circuit is decreased to ¾. This increases the width of the gate driver area (dimension in the direction in which the gate lines extend: horizontal size) in the liquid crystal panel (in the TFT substrate thereof), which contradicts a market requirement for reduced width of the outer frame in the liquid crystal display device.

On the contrary, the present embodiment which utilizes the pixel configuration as shown in FIG. 5(C) in which four sub pixel-formation portions for four primary colors are arranged in a 2×2 matrix pattern, offers the following advantages over the three primary color display device of a horizontally long subpixel configuration as shown in FIG. 5(B):

(1) Increase in the Number of Source Lines

The number of source lines is doubled. However, the number of source lines is halved as compared to a common four primary color display device which utilizes a vertically long subpixel configuration (FIG. 18).

(2) Decrease in Scanning Rate

Scanning rate (the number of gate lines scanned in a unit time) is decreased to ⅔. This makes it possible to decrease operation speed of the gate driver, and to reduce the size of the TFTs which are utilized to constitute the gate driver. This leads to reduced power consumption, and reduced area in the liquid crystal panel 600 (in the TFT substrate thereof) occupied by the gate driver.

(3) Increase in the height of GD unit circuit

The height (size in the vertical direction) of the GD unit circuit is increased to 3/2 times. This decreases the width of the gate driver area (size in the horizontal direction) in the TFT substrate thereof), satisfying the market requirement for reduced width of the outer frame in the liquid crystal display device.

As understood from the above, it is possible to reduce the number of source lines or the number of gate lines if a pixel configuration such as in the present embodiment, in which sub pixel-formation portions for handling the primary colors are arranged in a matrix pattern (hereinafter this configuration will be called "matrix-pattern subpixel layout configuration"), as compared to pixel configurations (FIG. 18 or FIG. 5(A), FIG. 5(B) and FIG. 19) in which sub pixel-formation portions for handling the primary colors are arranged in a straight line pattern in the direction in which the gate lines extend (horizontal direction) or in the direction in which the source lines extend (vertical direction). As the number of gate lines is reduced, it becomes possible to lower constraint conditions which limit integral formation of the gate driver with the pixel circuits on the TFT substrate of the liquid crystal panel for the benefit of reduced number of external parts, i.e., constraint conditions for implementing a gate driver monolithic panel (GDM panel) (specifically, the area of the gate driver, power consumption and operation speed). Therefore, matrix-pattern subpixel layout configuration in the GDM panel offers advantages in multi-primary color display devices.

<1.4 Functions>

Figure 19:
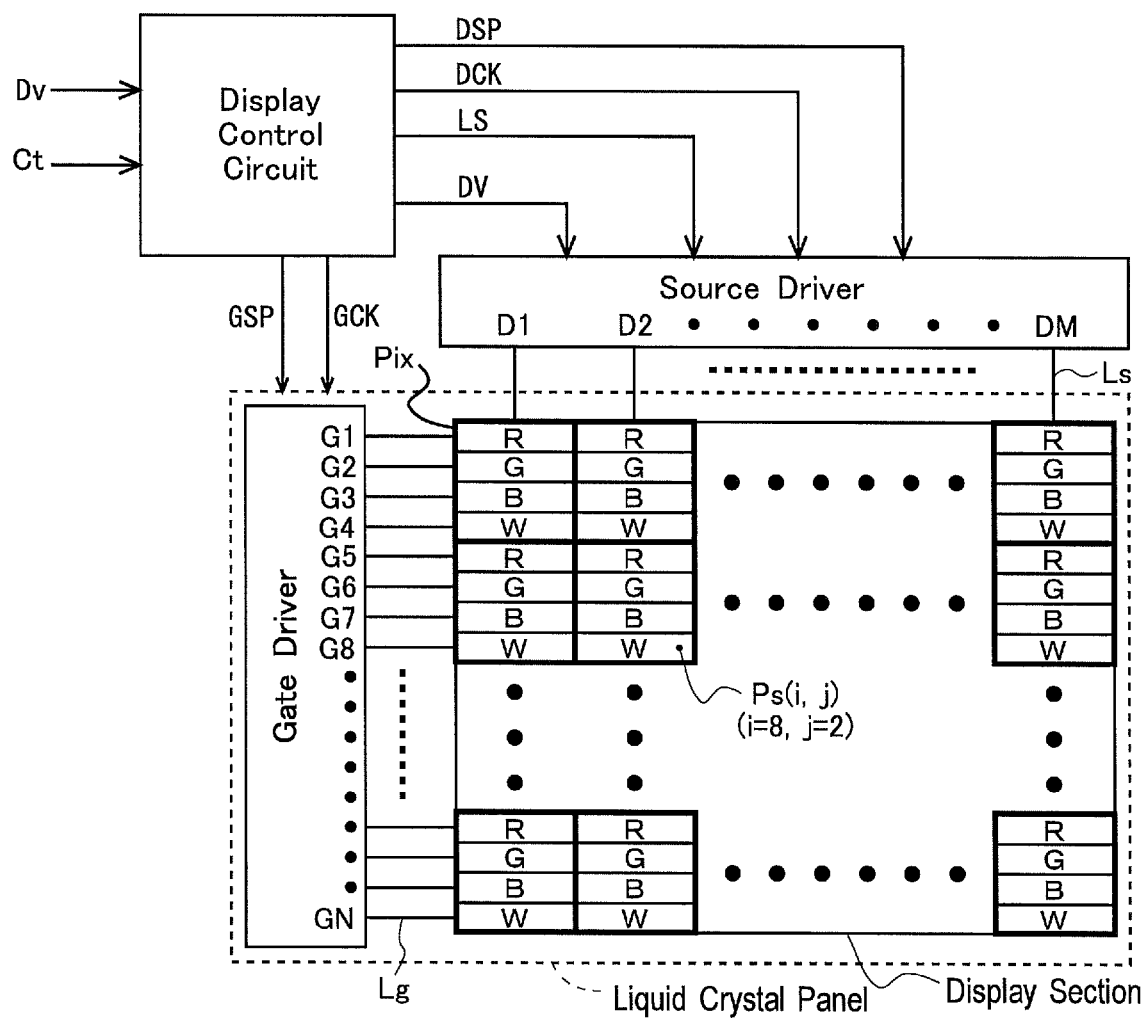
FIG. 19 is a block diagram which shows a configuration of a four primary color liquid crystal display device that is a conventional multi-primary color display device utilizing a horizontally long subpixel configuration.

According to the present embodiment as described above, it is possible to reduce the number of source lines or the number of gate lines as compared to pixel configurations (FIG. 18 or FIG. 5(A) and FIG. 19) in which four sub pixel-formation portions for handling the four primary colors are arranged in a straight line pattern in the direction in which the gate lines extend or in the direction in which the source lines extend, because the present embodiment utilizes a matrix-pattern subpixel layout configuration in which four sub pixel-formation portions for handling the four primary colors are arranged in a 2×2 matrix pattern (FIG. 1, FIG. 5 (C)). The arrangement makes it possible to reduce the area occupied by the gate driver, power consumed thereby and operation speed thereof while reducing increase in the amount of source driver circuit, in comparison to conventional liquid crystal display devices which utilize GDM panels. Therefore, the present embodiment makes it possible to increase the number of primary colors to four, and thereby improve display capability such as color reproduction capability while reducing the number of external parts through the use of GDM panels, satisfying the requirement for narrower frame, and reducing increase in the amount of drive circuit, power consumption and operation speed of the drive circuit.

<1.5 Variations, Etc.>

The first embodiment described thus far uses four primary colors with four sub pixel-formation portions, i.e., an R sub pixel-formation portion, a G sub pixel-formation portion, a B sub pixel-formation portion, and a W sub pixel-formation portion. The embodiment also uses a pixel configuration (matrix-pattern subpixel layout configuration) in which these pixel-formation portions are arranged in a 2×2 matrix pattern. However, the present invention is not limited to this. For example, the invention is also applicable to multi-primary color liquid crystal display devices which use a different set of four primary colors, such as R (red), G (green), B (blue) and Y (yellow), other than R (red), G (green), B (blue) and W (white). The present invention is also applicable to multi-primary color liquid crystal display devices which display color images based on multi-primary colors other than four primary colors. In this case, if the number of primary colors is represented by Npc, as many as Npc sub pixel-formation portions, or as many sub pixel-formation portions as the number of primary colors are arranged in an n×m matrix pattern to constitute each pixel formation portion (n, m≥2, Npc=n×m). The present invention requires that each of n and m is an integer not smaller than two. Also, the present invention is not limited to the color layout pattern in each pixel formation portion. In other words, the four sub pixel-formation portions, i.e., R sub pixel-formation portion, G sub pixel-formation portion, B sub pixel-formation portion, and W sub pixel-formation portion which constitute each pixel formation portion may be assigned to other positions than shown in FIG. 5(C), in the four places given by the 2×2 matrix pattern.

Further, the present invention does not limit the structure of the TFT which constitute the gate driver. In the description given thus far, there is no specific reference as to the structure of the TFT as a constituent member of the gate driver 400. The TFT for the gate driver 400 may be made, for example, of amorphous silicon or polysilicon. Also, the TFT may be provided by a transparent amorphous oxide semiconductor which typically includes indium, gallium, zinc and oxygen (IGZO). Further, the TFT may have an N-channel MOS (Metal Oxide Semiconductor) structure, or may have a P-channel MOS structure. Still further, the gate driver 400 may be constructed as a CMOS (Complementary Metal Oxide Semiconductor) circuit.

It should be noted here that the above-described variations to the first embodiment are also applicable to any of the embodiments which will be described hereinafter. Since this is readily understandable to those who are skilled in the art, no more descriptions will be made in relation to these variations when covering other embodiments.

<2. Second Embodiment>

Figure 6:
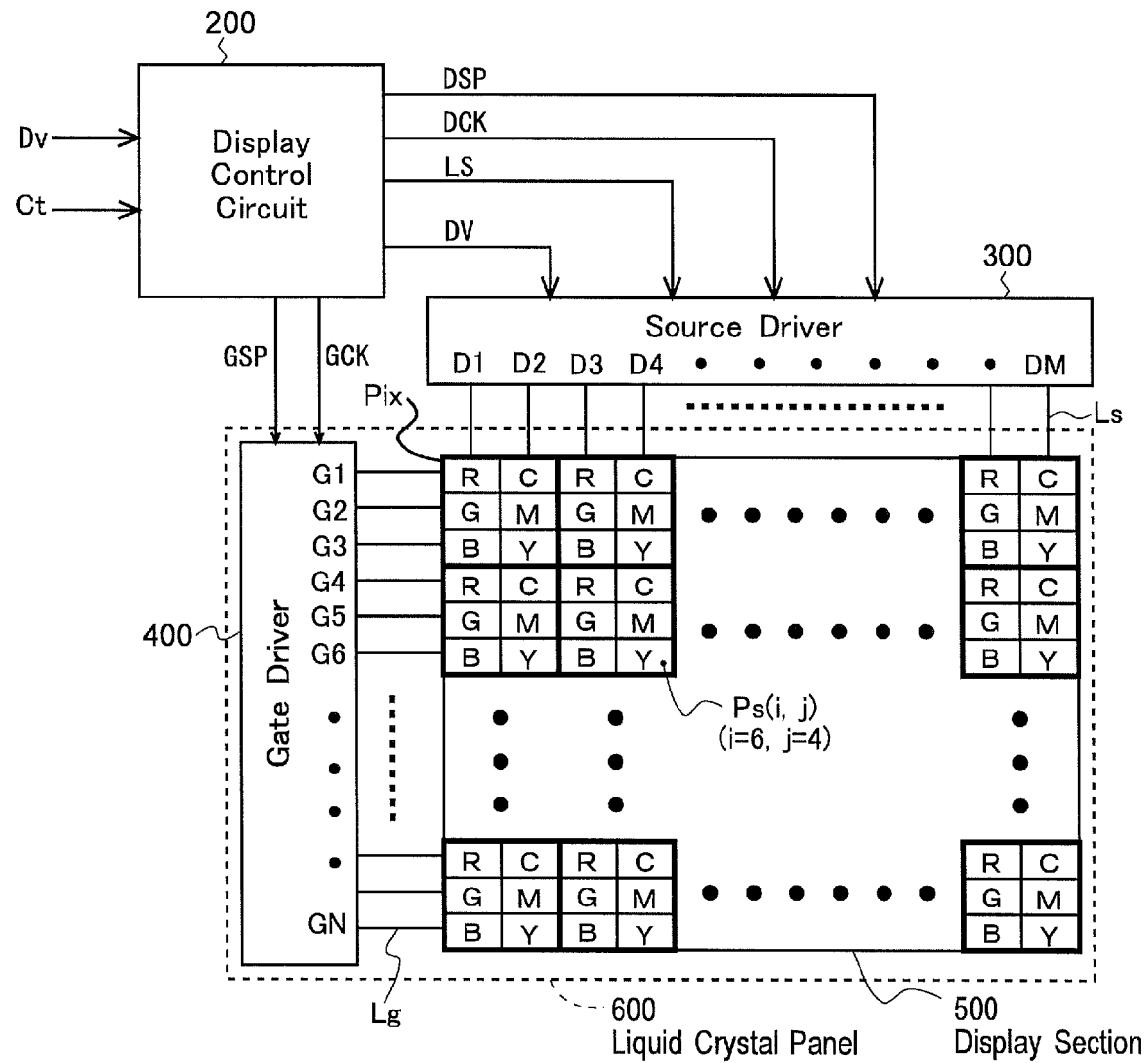
FIG. 6 is a block diagram which shows a configuration of a six primary color liquid crystal display device that is a multi-primary color display device according to a second embodiment of the present invention.

FIG. 6 is a block diagram which shows an overall configuration of a multi-primary color display device according to a second embodiment of the present invention. In FIG. 6, all constituent elements identical with or equivalent to those in the first embodiment are indicated by the same reference symbols. FIG. 6 shows a six primary color liquid crystal display device which displays color images based on six primary colors consisting of R (red), G (green), B (blue), C (cyan), M (magenta) and Y (yellow). The embodiment differs in this aspect from the first embodiment which displays color images based on four primary colors of R (red), G (green), B (blue) and W (white). As shown in FIG. 6, each pixel formation portion Pix in the present embodiment includes an R sub pixel-formation portion, a G sub pixel-formation portion, a B sub pixel-formation portion, a C sub pixel-formation portion, an M sub pixel-formation portion, and a Y sub pixel-formation portion, each handling one of the six primary colors, or R, G, B, C, M and Y (Note that any sub pixel-formation portions will be indicated by a reference symbol "Ps"). These six sub pixel-formation portions Ps are arranged in a 3×2 matrix pattern (three in the vertical direction and two in the horizontal direction).

Therefore, if the number of pixel formation portions Pix included in the vertical direction (the direction in which the source lines Ls extend) in the display section 500 is represented by Npix and the number of pixel formation portions Pix included in the horizontal direction (the direction in which the gate lines Lg extend) is represented by Mpix, then the display section 500 has an N×M matrix pattern in which there are N=3×Npix sub pixel-formation portions in the vertical direction and M=2×Mpix sub pixel-formation portions in the horizontal direction. Also, there are N=3×Npix gate lines Lg and M=2×Mpix source lines Ls formed on the display section 500, with a pixel circuit having a configuration as shown in FIG. 2 formed correspondingly to each intersection made by the gate lines Lg and the source lines Ls. It should be noted here that the R sub pixel-formation portion, the G sub pixel-formation portion, the B sub pixel-formation portion, the C sub pixel-formation portion, the M sub pixel-formation portion, and the Y sub pixel-formation portion include R, G, B, C, M and Y color filters respectively which constitute the six primary colors, in order to form R, G, B, C, M and Y subpixels in the images to be displayed.

Other aspects of the configuration and operation of the present embodiment than those described above will not be described here since they are clear enough from the first embodiment.

Figure 7:
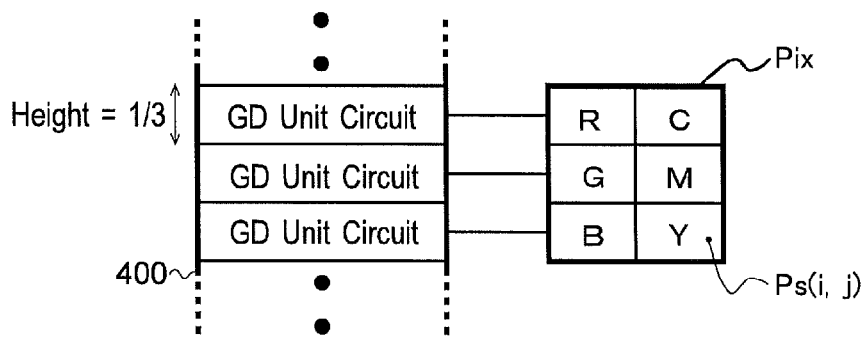
FIG. 7 is a block diagram for describing a relationship between pixel configuration and GD unit circuit in the second embodiment.

FIG. 7 is a block diagram for describing a relationship between pixel configuration and unit circuit (GD unit circuit) in the present embodiment. When compared to a conventional display device of a vertically long subpixel configuration as shown in FIG. 18, the height (the size in the vertical direction) of the GD unit circuit Ui is ⅓, in the present embodiment where six sub pixel-formation portions which handle six primary colors are arranged in a 3×2 matrix pattern as shown in FIG. 7.

As understood from FIG. 7, according to the present embodiment, it is possible to reduce the number of source lines or the number of gate lines as compared to pixel configurations in which six sub pixel-formation portions for the six primary colors are arranged in a straight line pattern in the direction in which the gate lines extend or in the direction in which the source lines extend, because the present embodiment utilizes a matrix-pattern subpixel layout configuration in which six sub pixel-formation portions for the six primary colors are arranged in a 3×2 matrix pattern. The arrangement makes it possible to reduce the area occupied by the gate driver, power consumed thereby and operation speed thereof while reducing increase in the amount of source driver circuit, in comparison to conventional liquid crystal display devices which utilize GDM panels. Therefore, the present embodiment makes it possible to increase the number of primary colors to six and thereby improve display capability such as color reproduction capability while reducing the number of external parts through the use of GDM panels, satisfying the requirement for narrower frame, and reducing increase in the amount of drive circuit, power consumption and operation speed of the drive circuit.

<3. Third Embodiment>

Figure 8:
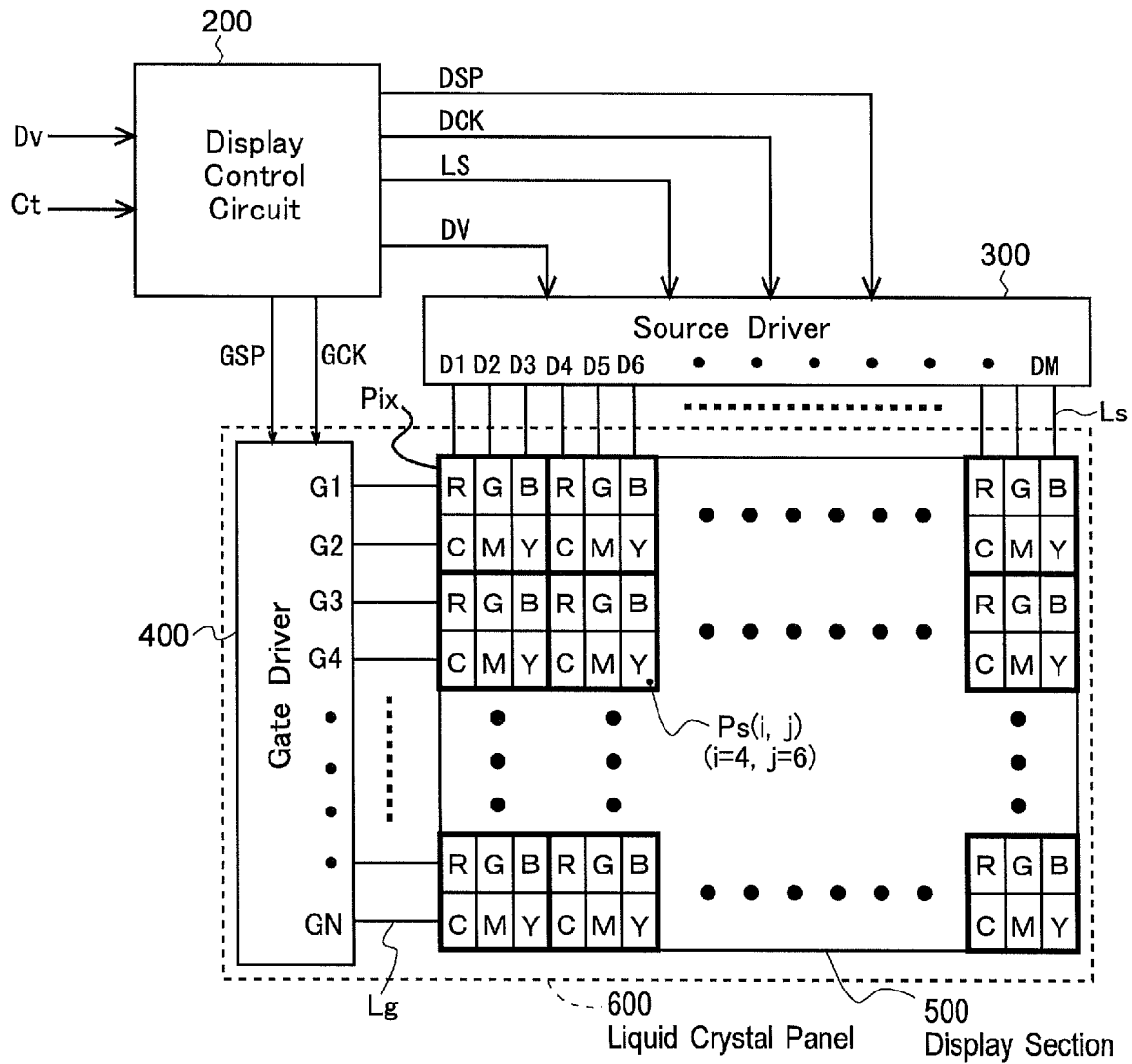
FIG. 8 is a block diagram which shows a configuration of a six primary color liquid crystal display device that is a multi-primary color display device according to a third embodiment of the present invention.

FIG. 8 is a block diagram which shows an overall configuration of a multi-primary color display device according to a third embodiment of the present invention. Again, in FIG. 8, all constituent elements identical or equivalent to those in the first embodiment are indicated by the same reference symbols. FIG. 8 shows a six primary color liquid crystal display device which displays color images based on six primary colors consisting of R (red), G (green), B (blue), C (cyan), M (magenta) and Y (yellow) like the second embodiment. As shown in FIG. 8, each pixel formation portion Pix in the present embodiment includes a R sub pixel-formation portion, a G sub pixel-formation portion, a B sub pixel-formation portion, a C sub pixel-formation portion, an M sub pixel-formation portion, and a Y sub pixel-formation portion, each handling one of the six primary colors, or R, G, B, C, M and Y (Note that any sub pixel-formation portions will be indicated by a reference symbol "Ps"). These six sub pixel-formation portions Ps are arranged in a 2×3 matrix pattern (two in the vertical direction and three in the horizontal direction). In this particular aspect, the present embodiment differs from the second embodiment in which six sub pixel-formation portions Ps for the six primary colors are arranged in a 3×2 matrix pattern. All the other aspects, however, are identical with those in the second embodiment, so no more details will be repeated here.

Figure 9:
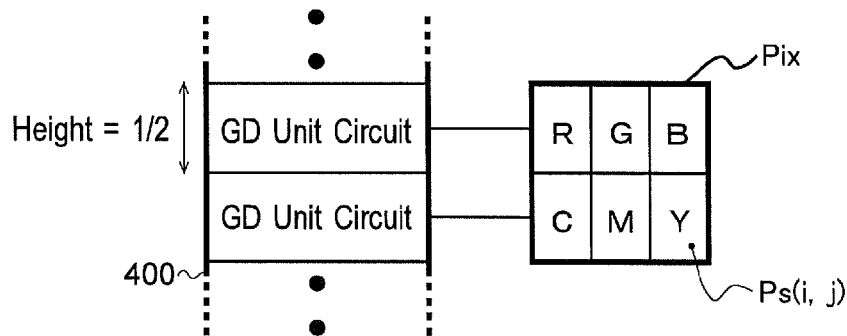
FIG. 9 is a block diagram for describing a relationship between pixel configuration and GD unit circuit in the third embodiment.

FIG. 9 is a block diagram for describing a relationship between pixel configuration and unit circuit (GD unit circuit) in the present embodiment. When compared to a conventional display device of a vertically long subpixel configuration as shown in FIG. 18, the height (the size in the vertical direction) of the GD unit circuit Ui is ½ in the present embodiment where six sub pixel-formation portions for six primary colors are arranged in a 2×3 matrix pattern as shown in FIG. 9.

As understood from FIG. 9, according to the present embodiment, it is possible to reduce the number of source lines or the number of gate lines as compared to pixel configurations in which six sub pixel-formation portions for the six primary colors are arranged in a straight line pattern in the direction in which the gate lines extend or in the direction in which the source lines extend, because the present embodiment utilizes a matrix-pattern subpixel layout configuration in which six sub pixel-formation portions for the six primary colors are arranged in a 2×3 matrix pattern. The arrangement makes it possible to reduce the area occupied by the gate driver, power consumed thereby and operation speed thereof while reducing increase in the amount of source driver circuit, in comparison to conventional liquid crystal display devices which utilize GDM panels. Therefore, the present embodiment makes it possible to increase the number of primary colors to six and thereby improve display capability such as color reproduction capability while reducing the number of external parts through the use of GDM panels, satisfying the requirement for narrower frame, and reducing increase in the amount of drive circuit, power consumption and operation speed of the drive circuit.

<4. Fourth Embodiment>

Figure 10:
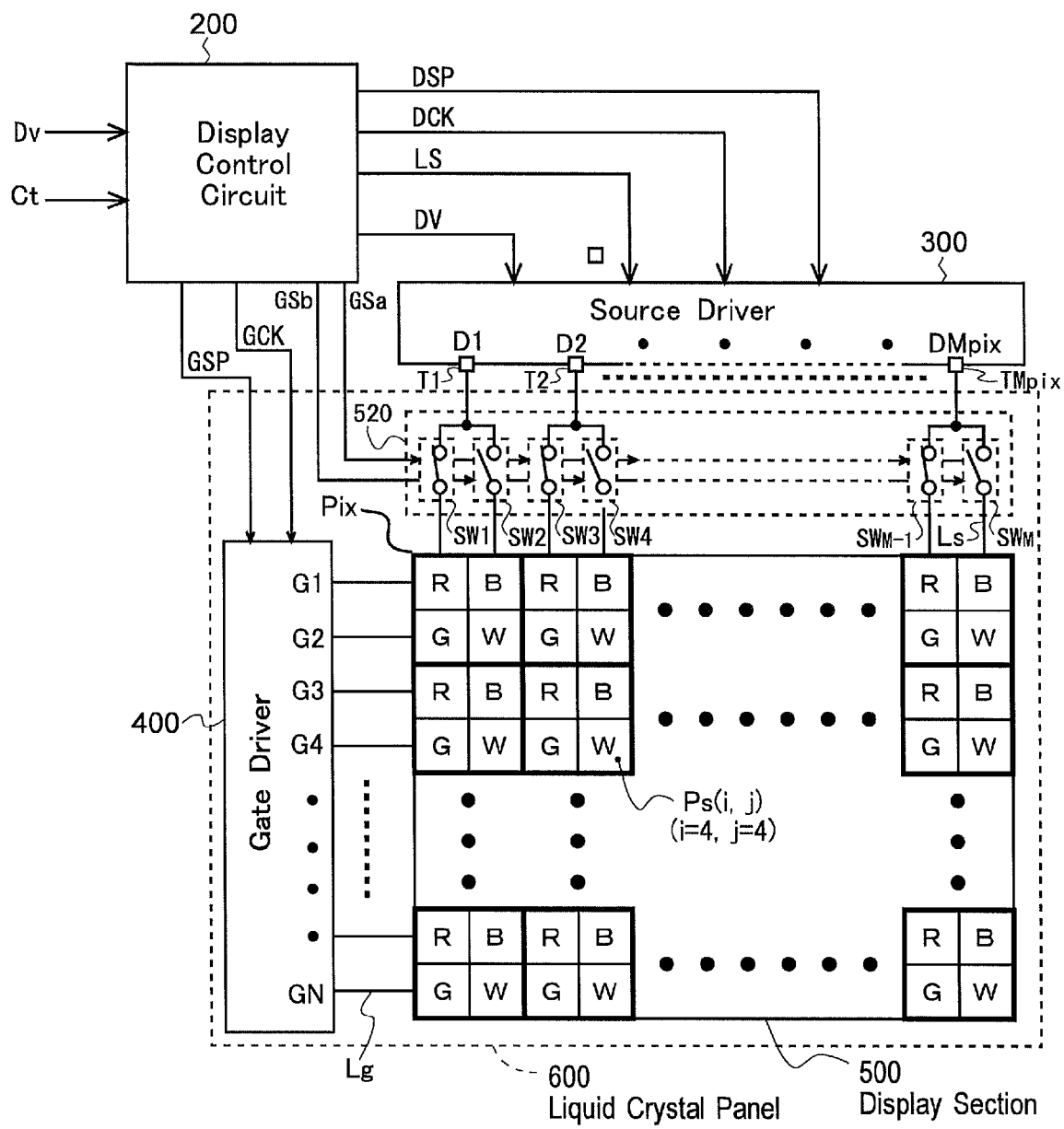
FIG. 10 is a block diagram which shows a configuration of a four primary color liquid crystal display device that is a multi-primary color display device according to a fourth embodiment of the present invention.
Figure 11:
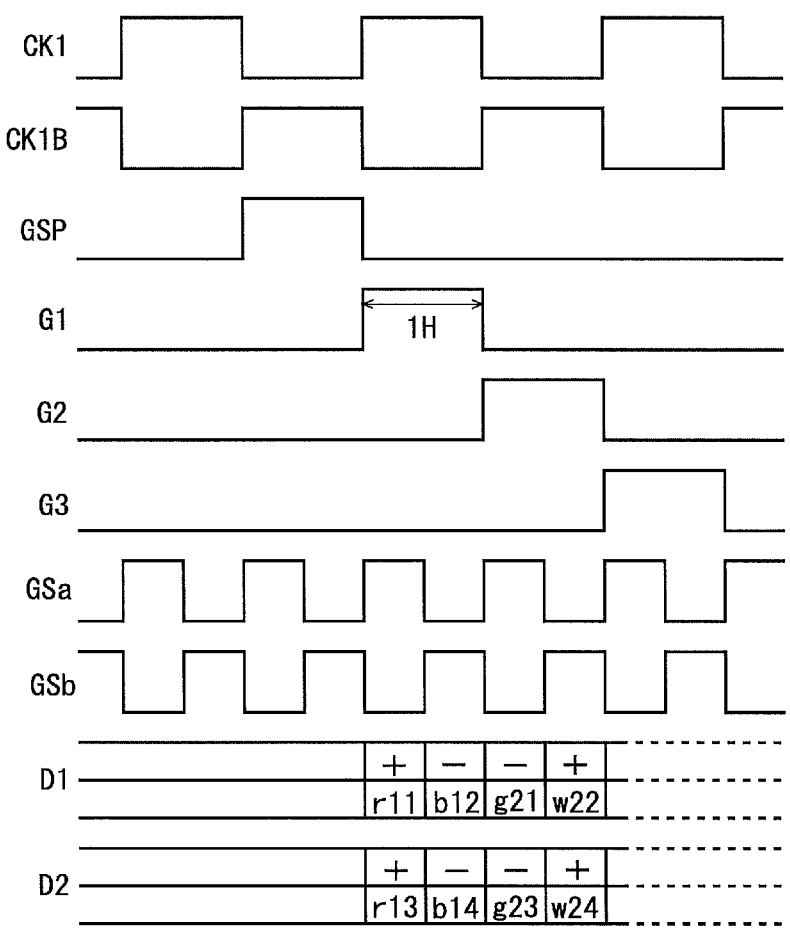
FIG. 11 is a timing chart for describing an operation of the multi-primary color display device according to the fourth embodiment.

FIG. 10 is a block diagram which shows an overall configuration of a multi-primary color display device according to a fourth embodiment of the present invention. Again, in FIG. 10, all constituent elements identical or equivalent to those in the first embodiment are indicated by the same reference symbols. FIG. 10 shows a four primary color liquid crystal display device which displays color images based on four primary colors consisting of R (red), G (green), B (blue) and W (white), but this embodiment differs from the first embodiment in that it includes a connection switching circuit 520 inserted between the source driver 400 and the display section 500. In the present embodiment, a first connection switching signal GSa and a second connection switching signal GSb as shown in FIG. 11 are generated in the display control section 200 as control signals for the connection switching circuit 520, and are supplied to the connection switching circuit 520. Hereinafter, description of the present embodiment will mainly focus on a configuration and operation of the connection switching circuit 520, without touching on other details. It should be noted that due to the addition of the connection switching circuit 520 in the present embodiment, the number of output terminals Tj of the source driver 300 for outputting the data signals Dj is equal to a half of the number M of the source lines Ls in the display section 500, i.e. equal to Mpix (the number M is equal to the number of the sub pixel-formation portions Ps in the horizontal direction in the display section 500).

Like the gate driver 400, the connection switching circuit 520 is formed by using thin film transistors (TFTs) on the liquid crystal panel 600 (on the TFT substrate thereof), integrally (simultaneously in the same process) with the pixel circuits, and includes, as shown in FIG. 10, analog switches SW1, SW2, SW3, . . . , SWM which are formed correspondingly to M source lines Ls in the display section 500, as parts for connecting the respective source lines Ls to the source driver 300. In these analog switches SW1, SW2, SW3, . . . , SWM, mutually adjacent two are paired to form a group. Thus, a plurality (a half of the quantity M of the source lines Ls=Mpix) of analog switch groups exist. Each of the analog switches SWi (i=1, 2, 3, . . . , M) has a first end connected to one of the source lines Ls corresponding to that analog switch SWi, and a second end connected to the second end of the other analog switch in the group to which this particular analog switch SWi belongs, and then to one of the output terminals Tj in the source driver 300 (j=1, 2, 3, . . . , Mpix=M/2).

As described above, the source lines Ls in the display section 500 of the liquid crystal panel 600 are divided into a plurality of source line groups each including two source lines as a pair. Each source line group (a paired two source lines Ls) are connected to one output terminal Tj in the source driver 300 via two analog switches in the same group.

Each analog switch SWi is implemented by a thin film transistor (TFT) formed on the liquid crystal panel 600 (on the TFT substrate thereof). As shown in FIG. 10, one of the two analog switches SW(2j−1), SW2j in each pair is supplied with the first connection switching signal GSa while the other is supplied with the second connection switching signal GSb (j=1, 2, . . . , Mpix=M/2). These first and second connection switching signals GSa, GSb turn ON/OFF the corresponding two analog switches SW(2j−1), SW2j in a contradicting manner (see FIG. 11). Therefore, the two analog switches SW(2j−1), SW2j in each pair constitute a changeover switch, which connects each of the output terminals Tj in the source driver 300 to the two source lines Ls which correspond thereto in a time-division manner.

FIG. 11 is a timing chart for describing an operation of the liquid crystal display device according to the present embodiment when a dot inversion driving is utilized as in the first embodiment. As shown in FIG. 11, N gate lines Lg in the display section 500 are respectively supplied with scanning signals G1, G2, G3, . . . , which sequentially assume H level (become active) for one horizontal period (one activation period for a gate line Lg). With these scanning signals G1, G2, G3, . . . , each gate line Lg becomes active sequentially for one horizontal period, turning ON the TFT 10 in the sub pixel-formation portion Ps which is connected to the activated gate line Lg. On the other hand, the TFT 10 in the sub pixel-formation portion Ps which is connected to the deactivated gate line Lg is turned OFF (see FIG. 2).

As shown in FIG. 11, the first connection switching signal GSa assumes H level during a first half of each horizontal period (for which each scanning signal Gk assumes H level), and L level during the second half of the period whereas the second connection switching signal GSb assumes L level during the first half of each horizontal period and H level during the second half of the period. Of all the analog switches in the connection switching circuit 520, those analog switches SW(2j−1) which are connected to odd-numbered source lines Ls are turned ON when the first connection switching signal GSa is at H level and turned OFF when the first connection switching signal GSa is at L level. On the other hand, those analog switches SW(2j) which are connected to even-numbered source lines Ls are turned ON when the second connection switching signal GSb is at H level and turned OFF when the second connection switching signal GSb is at L level. Therefore, each output terminal Tj in the source driver 300 is connected to odd-numbered (the (2j−1)th) source lines Ls in the first half of each horizontal period whereas it is connected to even-numbered (the 2j th) source line Ls in the second half of each horizontal period.

Correspondingly to the above-described operation of the connection switching circuit 520 and the resulting connection switching between each output terminal Tj and the source lines Ls in the source driver 300, the source driver 300 outputs signals to be applied to M source lines Ls in the display section 500, in the time-division manner, as data signals D1 through DMpix. For example, data signals D1, D2 as shown in FIG. 11 are outputted from the output terminals T1, T2 of the source driver 300. As has been mentioned earlier, each of the timing charts of the data signals D1, D2 in FIG. 11 has an upper row which shows the polarity of the data signals D1, D2, and a lower row which shows values of the data signals D1, D2. The symbol xij (x=r, g, b, w; i=1, 2, . . . , N; j=1, 2, . . . , Mpix) indicates a voltage to be captured and held by the X sub pixel-formation portion Ps.

The present embodiment described above offers, in addition to the same advantages as offered by the first embodiment, an advantage that the time-division driving of the source lines Ls in the display section 500 enables to widen (double) the connection pitch of the output terminals in the source driver 300 to the source lines Ls, and that the amount of circuit, operation speed and power consumption of the source driver 300 can be reduced.

It should be noted here that in the fourth embodiment, the source lines Ls are grouped so that each group contains two source lines Ls (or two analog switches). However, grouping of the source lines Ls may be made in such a fashion that each group contains three or a greater predetermined number of source lines Ls. In this case, the source driver 300 outputs, from each of its output terminals Tj in a time-division manner, data signals to be carried by the predetermined number of source lines Ls which constitute the group assigned to said output terminal, and make switching in the time-division manner between the source lines Ls within the group to which each output terminal Tj is connected, using a connection switching circuit constituted by analog switches which are provided for each of the source lines Ls.

<5. Fifth Embodiment>

Next, description will be made for a multi-primary color display device according to a fifth embodiment of the present invention. Like the first embodiment, this display device is a four primary color liquid crystal display device which displays color images based on four primary colors consisting of R (red), G (green), B (blue) and W (white), and has substantially the same configuration as the first embodiment (see FIG. 1 through FIG. 3). Therefore, the same or corresponding elements will be indicated with the same reference symbols and their description will not be repeated.

Figure 12:
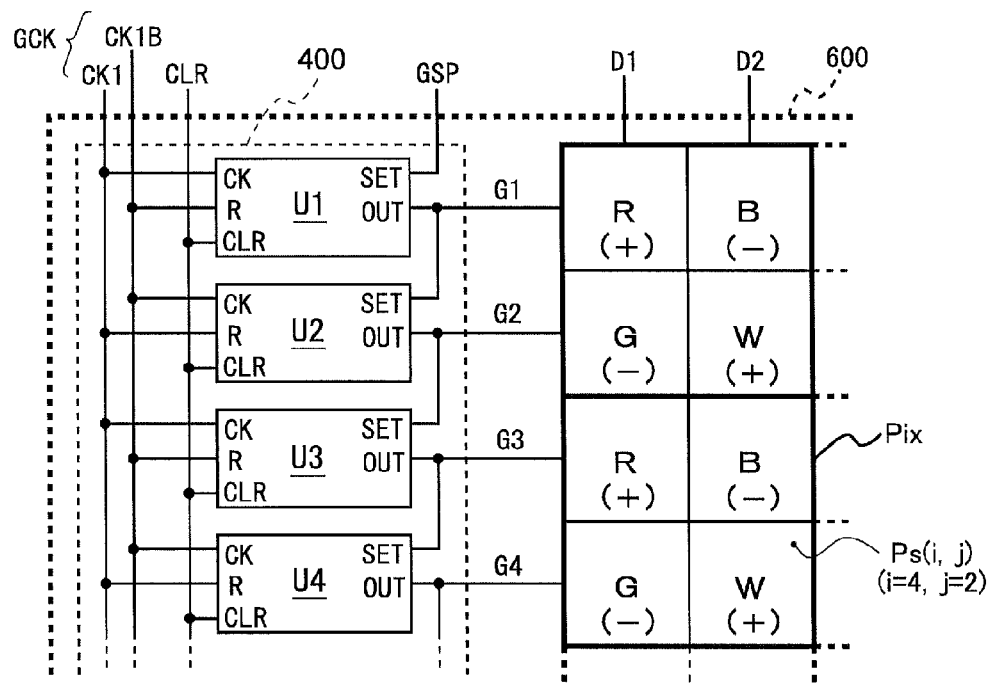
FIG. 12 is a circuit diagram which shows a configuration of a gate driver in a multi-primary color liquid crystal display device according to a fifth embodiment of the present invention.
Figure 13:
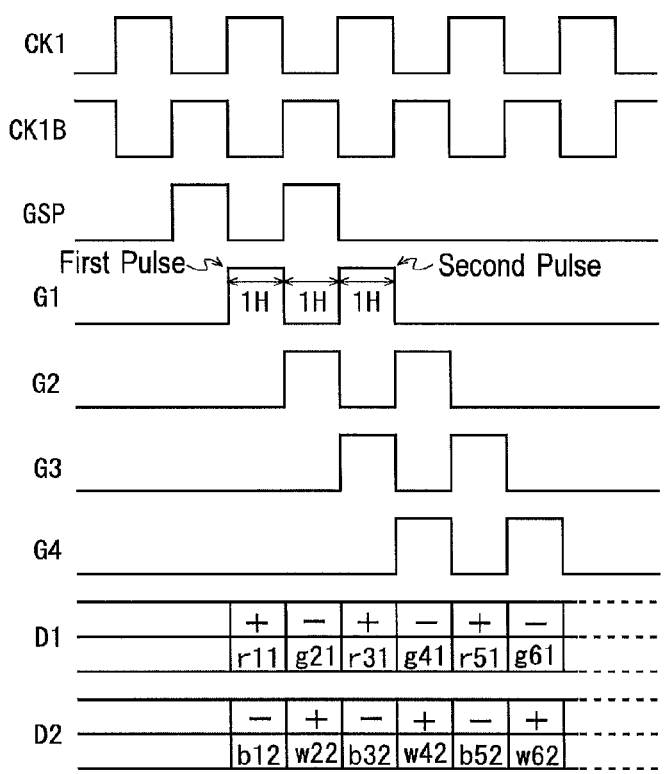
FIG. 13 is a timing chart for describing an operation of the multi-primary color display device according to the fifth embodiment.

FIG. 12 is a circuit diagram which shows a configuration of the gate driver 400 in the present embodiment whereas FIG. 13 is a timing chart for describing an operation of the four primary color liquid crystal display device according to the present embodiment. Hereinafter, an operation of this four primary color liquid crystal display device according to the present embodiment will be described with reference to FIG. 12 and FIG. 13.

As shown in FIG. 12, the present embodiment is the same as the first embodiment in the configuration of the gate driver 400 (see FIG. 3). However, as shown in FIG. 13, the gate start pulse signal GSP which is supplied to the gate driver 400 has a different waveform from the one in the first embodiment. Specifically, the gate start pulse signal GSP in the present embodiment contains two pulses in each frame period, with one horizontal period (1H) between the two pulses. Accordingly, as shown in FIG. 13, each scanning signal Gi (i=1, 2, . . . , N) also contains two pulses in each frame period, with one horizontal period between the two pulses.

Hereinafter, forgoing one of the two pulses contained in each frame period of each scanning signal Gi will be called "the first pulse" whereas the subsequent pulse will be called "the second pulse". Now, take a sub pixel-formation portion Ps(i, j) (j=1 through M) which is connected to the i-th gate line Lg. During the second pulse of the scanning signal Gi, the sub pixel-formation portion Ps(i, j) (j=1 through M) captures a voltage as a data signal Dj, from its relevant source line Ls and gives the voltage to its pixel capacitance Cp. Then, the voltage is held at the pixel capacitance Cp substantially for one frame period, as a subpixel value. During the first pulse which is immediately before the said second pulse, a voltage which has the same polarity as of the voltage to be captured during the coming second pulse is supplied to the pixel capacitance Cp of the sub pixel-formation portion Ps(i, j) (see FIG. 2) from the source line Ls via the TFT 10, whereby preliminary charging is performed to the pixel capacitance Cp. Therefore, the first pulse period may be called "preliminary charging period" whereas the second pulse period may be called "main charging period". As shown in FIG. 12, the present embodiment uses four primary colors with four sub pixel-formation portions (R sub pixel-formation portion, a G sub pixel-formation portion, a B sub pixel-formation portion, and a W sub pixel-formation portion) Ps, and these four portions are arranged in a 2×2 matrix pattern, so the embodiment has a color cyclic number of two in the direction in which the source lines Ls extend. In other words, the vertical color cyclic number in this embodiment is two. Therefore, during the preliminary charging period (the first pulse period), preliminary charging is performed to the pixel capacitance Cp of the sub pixel-formation portion Ps(i, j), at a voltage which represents the value of the data signal Dj which is supposed to be captured by the sub pixel-formation portion Ps(i−2, j) that handle the same color as the sub pixel-formation portions Ps(i, j) that is supposed to capture the data signal Dj during the main charging period (the second pulse period).

The source driver 300 outputs data signals D1 through DM (see FIG. 13) which are substantially the same as in the first embodiment.

According to the present embodiment as described above, preliminary charging is performed (during the first pulse period) immediately preceding the main charging period, at a voltage which represents a subpixel value of the same polarity and the same color as the sub pixel value indicated by the data signal Di that is to be captured by the sub pixel-formation portion Ps(i, j) during the main charging period. Hence, the present embodiment offers, in addition to the same advantages as offered by the first embodiment, an advantage that the pixel capacitance Cp has an improved charge rate, preventing deficient charging which could otherwise be a risk in the multi-primary color display devices.

It should be noted here that since the fifth embodiment uses a configuration in which four primary colors are handled by four sub pixel-formation portions which are arranged in a 2×2 matrix pattern, the first pulse period (preliminary charging period) in each scanning signal Gi is provided by a horizontal period which precedes the second pulse period (main charging period) by two horizontal periods. This configuration can be generalized as follows: For a configuration in which as many as Npc primary colors are handled by Npc sub pixel-formation portions which are arranged in an n×m matrix pattern (n, m≥2, Npc=n×m), the first pulse period (preliminary charging period) in each scanning signal Gi should be provided by a horizontal period which precedes the second pulse period (main charging period) by as many as n horizontal periods, i.e., as many periods as the vertical color cyclic number. Also, for liquid crystal display devices in which data signal polarity is reversed for each predetermined number of horizontal periods, it is necessary, in addition to the above-described arrangement, to use a pixel configuration (matrix-pattern subpixel layout configuration) which has an even vertical color cyclic number, and to reverse the polarity of data signals D1 through DM per such a number of horizontal periods as determined by a division of the vertical color cyclic number by an even aliquot thereof, in order to perform preliminary charging at a voltage of the same polarity as the polarity of charging during the main charging period. For example, for a six primary color display device, a configuration in which the six primary colors are handled by six sub pixel-formation portions that are arranged in a 2×3 matrix pattern (two in the vertical direction and three in the horizontal direction) should be used. In this arrangement, the vertical color cyclic number is "2" and a division of this number by its even aliquot gives a quotient of "1". Therefore, it is necessary to reverse the polarity of the data signals D1 through DM for each horizontal period (one horizontal period).

Also, in the fifth embodiment, each scanning signal Gi contains two pulses in each frame period. There may be a different arrangement, however, that each scanning signal Gi contains three or more pulses, providing a plurality of pulses for preliminary charging periods.

<6. Sixth Embodiment>

Next, description will be made for a multi-primary color display device according to a sixth embodiment of the present invention. Like the first embodiment, this display device is a four primary color liquid crystal display device which displays color images based on four primary colors consisting of R (red), G (green), B (blue) and W (white), and has substantially the same configuration as the first embodiment (see FIG. 1 through FIG. 3). Therefore, the same or corresponding elements will be indicated with the same reference symbols and their description will not be repeated.

Figure 14:
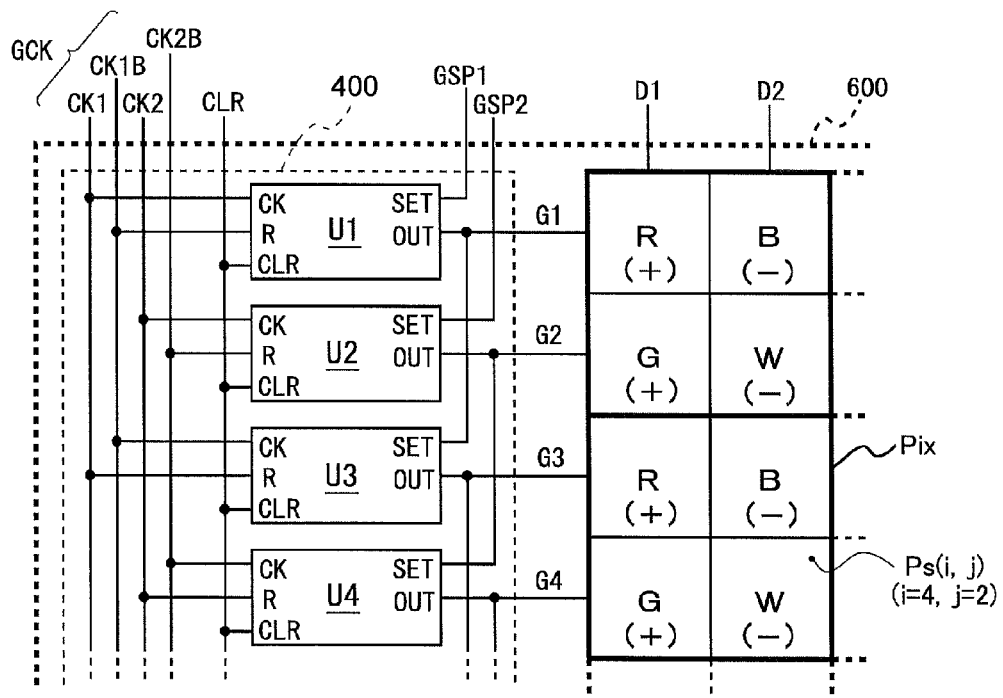
FIG. 14 is a circuit diagram which shows a configuration of a gate driver in a multi-primary color liquid crystal display device according to a sixth embodiment of the present invention.
Figure 15:
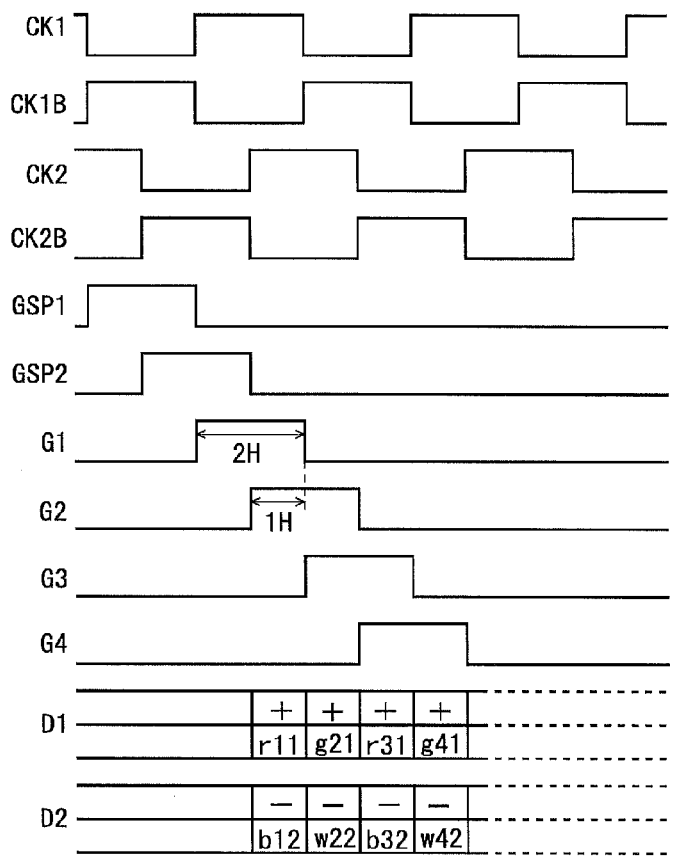
FIG. 15 is a timing chart for describing an operation of the multi-primary color display device according to the sixth embodiment.

FIG. 14 is a circuit diagram which shows a configuration of the gate driver 400 in the present embodiment whereas FIG. 15 is a timing chart for describing an operation of the four primary color liquid crystal display device according to the present embodiment. Hereinafter, an operation of this four primary color liquid crystal display device according to the present embodiment will be described with reference to FIG. 14 and FIG. 15.

In the present embodiment, the gate driver 400 is constituted by as many as N GD unit circuits U1 through UN, and as shown in FIG. 14, these unit circuits are cascade-connected while skipping every other unit circuit. As shown in FIG. 15, the first and the second start pulse signals GSP1, GSP2 contain pulses each having a width equal to two horizontal periods and a time lag of one horizontal period. These signals are supplied as the gate start pulse signals GSP, to the gate driver 400 (to the first-stage GD unit circuit U1 and the second-stage GD unit circuit U2 respectively) while a two-phased clock signal as shown in FIG. 15, composed of the first clock signal and the reversed clock signal CK1, CK1B, the second clock signal and the reversed clock signal CK2, CK2B, is supplied as the gate clock signal GCK, to the gate driver 400.

In such an arrangement where the GD unit circuits U1 through UN are so connected that the first and the second start pulse signals GSP1, GSP2 are shifted sequentially by skipping every other line, odd-numbered GD unit circuits U1, U3, . . . provide a first shift register and even-numbered GD unit circuits U2, U4, . . . provide a second shift register. Then, the first start pulse signal GSP1 is sequentially shifted in the first shift register whereas the second start pulse signal GSP2 is sequentially shifted in the second shift register. Thus, as shown in FIG. 15, the gate driver 400 generates scanning signals G1 through GN so that each scanning signal Gi contains a pulse of a width equal to two horizontal periods and that these pulses overlap with each other for one horizontal period in two scanning signals Gi−1 and Gi which are to be supplied to two mutually adjacent gate lines Lg.

Differing from the first embodiment, the present embodiment utilizes an inversion driving method (FIG. 14 shows an example so-called source inversion driving method) where polarity of the data signals D1 through DM is inverted for each frame period but polarity of the data signals D1 through DM is not inverted within the same frame period. Accordingly, the source driver 300 generates data signals D1 through DM as shown in FIG. 15 in conformity to such an inversion driving method.

According to the present embodiment as described above, the width of the pulse contained in each scanning signal Gi is two times the conventional width (two horizontal periods), and during this pulse width period, each data signal Dj has the same polarity. Specifically, not only the gate lines Lg of the liquid crystal panel 600 are sequentially activated for one horizontal period so that each sub pixel-formation portion Ps will capture a voltage, as a subpixel value of an image which is to be displayed, in the source line Ls which passes through the corresponding intersection, but also the gate lines Lg are activated for one horizontal period immediately before the said horizontal, activation period (i.e., immediately before the horizontal period used as the main charging period), and further, the voltage polarity in the source lines Ls during the said preceding horizontal period is the same as the voltage polarity in the source lines Ls during the horizontal period used as the main charging period. The present arrangement offers an advantage, in addition to the same advantages offered by the first embodiment, that the pixel capacitance Cp has an improved charge rate, preventing deficient charging which could otherwise be a risk in multi-primary color display devices.

<7. Seventh Embodiment>

Next, description will be made for a multi-primary color display device according to a seventh embodiment of the present invention. Like the first embodiment, this display device is a four primary color liquid crystal display device which displays color images based on four primary colors consisting of R (red), G (green), B (blue) and W (white), and has substantially the same configuration as the first embodiment (see FIG. 1 through FIG. 3). Therefore, the same or corresponding elements will be indicated with the same reference symbols and their description will not be repeated.

Figure 16:
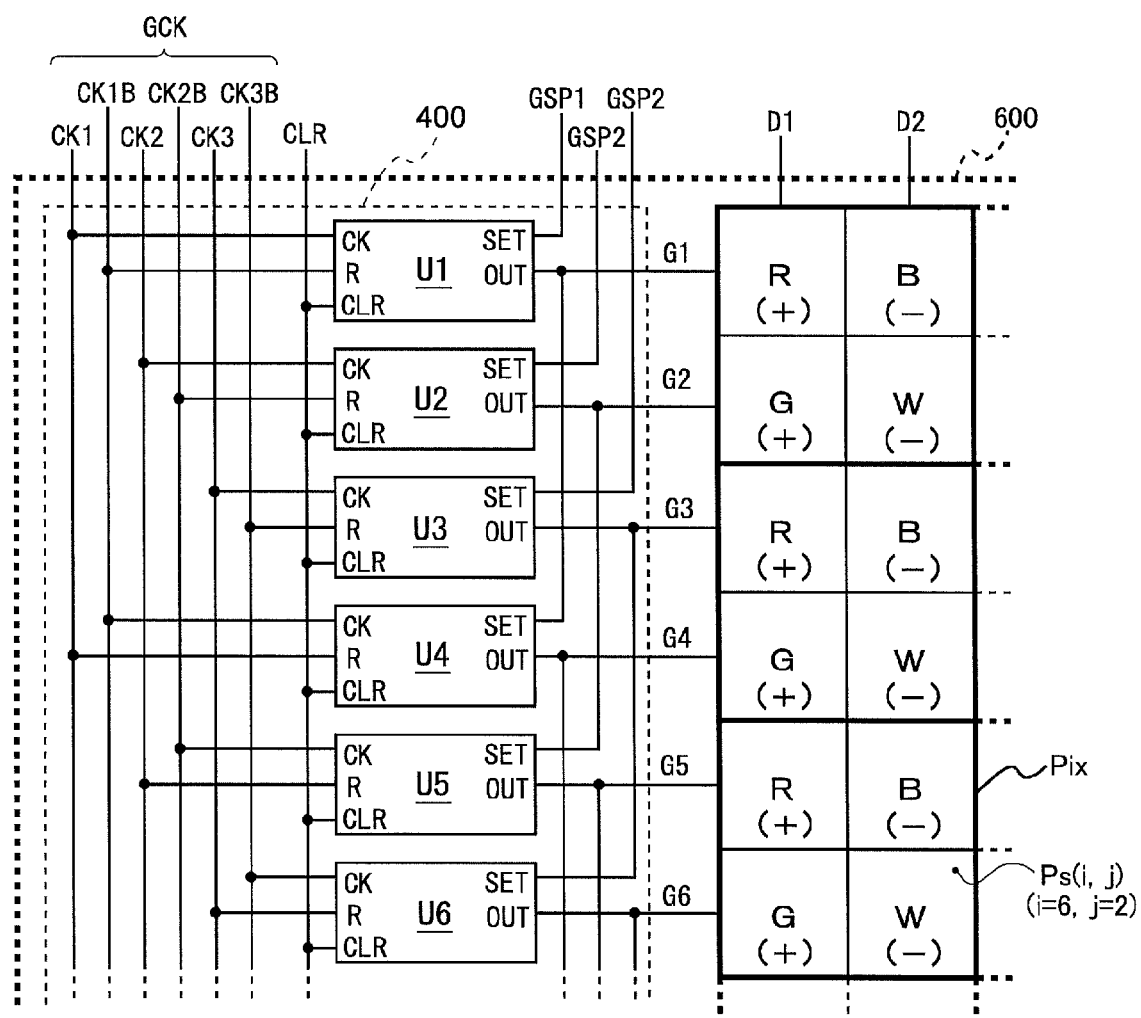
FIG. 16 is a circuit diagram which shows a configuration of a gate driver in a multi-primary color liquid crystal display device according to a seventh embodiment of the present invention.
Figure 17:
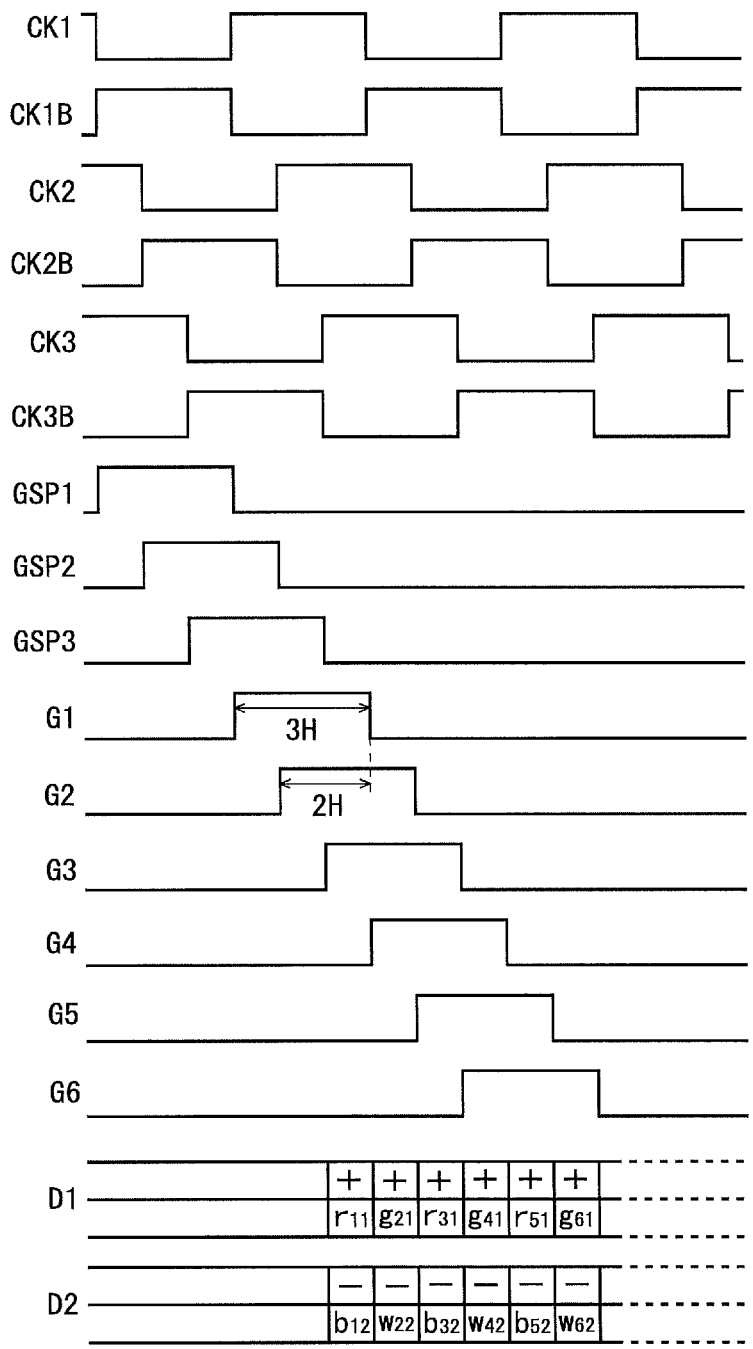
FIG. 17 is a timing chart for describing an operation of the multi-primary color display device according to the seventh embodiment.

FIG. 16 is a circuit diagram which shows a configuration of the gate driver 400 in the present embodiment whereas FIG. 17 is a timing chart for describing an operation of the four primary color liquid crystal display device according to the present embodiment. Hereinafter, an operation of this four primary color liquid crystal display device according to the present embodiment will be described with reference to FIG. 16 and FIG. 17.

In the present embodiment, the gate driver 400 is constituted by as many as N GD unit circuits U1 through UN, and as shown in FIG. 16, these unit circuits are cascade-connected while skipping every two unit circuits. As shown in FIG. 17, the first, the second and the third start pulse signals GSP1, GSP2, GSP3 contain pulses each having a width equal to three horizontal periods and a time lag of one horizontal period. These signals are supplied as the gate start pulse signals GSP to the gate driver 400 (to the first-stage GD unit circuit U1, the second-stage GD unit circuit U2 and the third-stage GD unit circuit U3 respectively) while a three-phased clock signal as shown in FIG. 17, composed of the first clock signal and the reversed clock signals CK1, CK1B, the second clock signal and the reversed clock signals CK2, CK2B, and the third clock signal and the reversed clock signals CK3, CK3B, is supplied as the gate clock signal GCK, to the gate driver 400.

In such an arrangement where the GD unit circuits U1 through UN are so connected that the first, the second and the third start pulse signals GSP1, GSP2, GSP3 are shifted sequentially by skipping every two lines, the (3k−2)th GD unit circuits U1, U4, . . . provides a first shift register, the (3k−1)th GD unit circuits U2, U5, . . . provide a second shift register, and the (3k)th GD unit circuits U3, U6, . . . provide a third shift register (k=1, 2, . . . ). Then, the first start pulse signal GSP1 is sequentially shifted in the first shift register whereas the second start pulse signal GSP2 is sequentially shifted in the second shift register, and the third start pulse signal GSP3 is sequentially shifted in the third shift register. Thus, as shown in FIG. 17, the gate driver 400 generates scanning signals G1 through GN so that each scanning signal Gi contains pulses of a width equal to three horizontal periods and that these pulses overlap with each other for two horizontal periods in two scanning signals Gi−1 and Gi which are to be supplied to two mutually adjacent gate lines Lg.

Differing from the first embodiment, the present embodiment utilizes an inversion driving method (FIG. 16 shows an example so-called source inversion driving method) where polarity of the data signals D1 through DM is inverted for each frame period but polarity of the data signals D1 through DM is not inverted within the same frame period. Accordingly, the source driver 300 generates data signals D1 through DM as shown in FIG. 17 in conformity to such an inversion driving method.

According to the present embodiment as described above, the width of the pulse contained in each scanning signal Gi is three times the conventional width (three horizontal periods), and during this pulse width period, each data signal Dj has the same polarity. Specifically, not only the gate lines Lg of the liquid crystal panel 600 are sequentially activated for one horizontal period so that each sub pixel-formation portion Ps will capture a voltage, as a subpixel value of an image which is to be displayed, in the source line Ls which passes through the corresponding intersection, but also the gate lines Lg are activated for two horizontal periods immediately before the said horizontal activation period (i.e., immediately before the horizontal period used as the main charging period), and further, the voltage polarity in the source lines Ls during the said two preceding horizontal periods is the same as the voltage polarity in the source lines Ls during the horizontal period used as the main charging period. The present arrangement offers an advantage, in addition to the same advantages offered by the first embodiment, that the pixel capacitance Cp has an improved charge rate, preventing deficient charging which could otherwise be a risk in the multi-primary color display devices.

It should be noted here that the seventh embodiment can be generalized as the configuration in which the width of the pulse contained in each scanning signal Gi is n times the conventional width (n horizontal periods) (n represents an integer not smaller than two). To implement this, the GD unit circuits U1 through UN are cascade-connected by skipping every (n−1) stages thereby constituting n shift registers, and then the first through the n-th start pulse signals GSP1 through GSPn, in which each pulse has a time lag of one horizontal period and a width of n horizontal periods, are inputted to these n shift registers respectively. In this case, the gate driver 400 generates scanning signals G1 through GN so that each scanning signal Gi contains pulses of a width equal to n horizontal periods and that these pulses overlap with each other for (n−1) horizontal periods in two scanning signals Gi−1 and Gi which are the signals to be supplied to two mutually adjacent gate lines Lg.

<8 Variations>

Thus far, liquid crystal display devices have been taken as embodiments of the present invention. However, the present invention is not limited to these. In other words, the present invention is applicable also to other kinds of display devices such as organic EL (Electroluminescenece) display devices as far as they are matrix type multi-primary color display devices.

INDUSTRIAL APPLICABILITY

The present invention is applicable to matrix type multi-primary color display devices which display color images based on four or more primary colors.

LEGEND

10 . . . TFT (thin film transistor)
200 . . . Display control circuit
300 . . . Source driver (data signal line drive circuit)
400 . . . Gate driver (scanning signal line drive circuit)
500 . . . Display section
600 . . . Liquid crystal panel
Pix . . . Pixel formation portion
Ps, Ps (i, j) . . . Sub pixel-formation portions Ls . . . Source lines (data signal line)
Lg . . . Gate line (scanning signal lines)
Ep . . . Pixel electrode
Ec . . . Common electrode
Clc . . . Liquid crystal capacitance (predetermined capacitance)
Cp . . . Pixel capacitance (predetermined capacitance)
Ui . . . GD unit circuit (i=1 through N)
Dj . . . Data signal (j=1 through M)
Gi . . . Scanning signal (i=1 through N)
GSP . . . Gate start signal
GCK . . . Gate clock signal

The invention claimed is:

1. A multi-primary color display device for displaying color images based on four or a greater predetermined number of primary colors, comprising:
  a display panel including a plurality of pixel formation portions arranged in a matrix pattern, a plurality of data signal lines and a plurality of scanning signal lines crossing the data signal lines;
  a data signal line drive circuit for applying a plurality of data signals which represent an image to be displayed, to the data signal lines; and
  a scanning signal line drive circuit for selectively activating the scanning signal lines; wherein
  the scanning signal line drive circuit is formed on the display panel;
  each pixel formation portion includes a predetermined number of sub pixel-formation portions for forming subpixels of said predetermined number of primary colors;
  the predetermined number of sub pixel-formation portions included in each pixel formation portion are arranged in a matrix pattern consisting of a plurality of rows extending in a direction in which the scanning signal lines extend and a plurality of columns extending in a direction in which the data signal lines extend;
  each of the sub pixel-formation portions included in the pixel formation portions corresponds to one of intersections made by the data signal lines and the scanning signal lines, and is connected to the data signal line and the scanning signal line which pass through said intersection;
  each sub pixel-formation portion includes a predetermined capacitance, captures and supplies a voltage in the data signal line which passes through the corresponding intersection to the predetermined capacitance when the corresponding scanning signal line is activated; and
  the scanning signal line drive circuit sequentially activates the scanning signal lines for a predetermined period so that each sub pixel-formation portion captures the voltage in the data signal line as a subpixel value of the image to be displayed, while also activating each scanning signal line for a predetermined period preceding said period of sequential activation by as many periods as a vertical color cyclic number, the vertical color cyclic number being defined as a quantity of the sub pixel-formation portions within each pixel formation portion in a direction in which the data signal lines extend.

2. The multi-primary color display device according to claim 1,
  wherein the vertical color cyclic number is provided by an even number, and
  wherein the data signal line drive circuit reverses polarity of the data signals once per a number of horizontal periods given by a multiplication of the horizontal period by a quotient which is obtained by dividing the vertical color cyclic number by an even aliquot thereof.

3. The multi-primary color display device according to claim 2,
  wherein the color images are based on four primary colors,
  wherein the four sub pixel-formation portion included in each pixel formation portion are arranged in a matrix pattern consisting of two rows extending in a direction in which the scanning signal lines extend and two columns extending in a direction in which the data signal lines extend, and
  wherein the data signal line drive circuit reverses polarity of the data signals once per each horizontal period.

* * * * *